US010131331B2

(12) United States Patent
Monzaki et al.

(10) Patent No.: US 10,131,331 B2
(45) Date of Patent: Nov. 20, 2018

(54) BRAKING FORCE CONTROL DEVICE

(71) Applicant: TOYOTA JIDOSHA KABUSHIKI KAISHA, Toyota-shi, Aichi-ken (JP)

(72) Inventors: Shiro Monzaki, Mishima (JP); Tamio Kano, Susono (JP); Tomoaki Morimoto, Gotenba (JP); Daiji Watanabe, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 134 days.

(21) Appl. No.: 15/132,546

(22) Filed: Apr. 19, 2016

(65) Prior Publication Data
US 2016/0304068 A1 Oct. 20, 2016

(30) Foreign Application Priority Data
Apr. 20, 2015 (JP) .................. 2015-086181

(51) Int. Cl.
*B60T 8/24* (2006.01)
*B60T 8/171* (2006.01)

(52) U.S. Cl.
CPC ........... *B60T 8/171* (2013.01); *B60T 2230/04* (2013.01)

(58) Field of Classification Search
CPC ............................ B60T 8/171; B60T 2230/04
See application file for complete search history.

(56) References Cited

U.S. PATENT DOCUMENTS

2016/0251004 A1* 9/2016 Kim .................... B60T 8/17616
701/78

FOREIGN PATENT DOCUMENTS

| JP | 2012-126352 A | 7/2012 |
| JP | 2013-154801 A | 8/2013 |
| JP | 2015-168311 A | 9/2015 |

OTHER PUBLICATIONS

Machine Translation of Japanese Patent Publication 2012/126352, printed Oct. 23, 2017 (Year: 2012).*

* cited by examiner

*Primary Examiner* — Alan D Hutchinson
(74) *Attorney, Agent, or Firm* — Sughrue Mion, PLLC

(57) ABSTRACT

A braking force control device includes an actuator configured to control a braking force generated in vehicle wheels of a vehicle and a control unit configured to output a braking force command value to the actuator. The control unit is configured to perform at least one of the following processes of generating a braking force command value by performing a filter processing on a required braking force based on a braking operation amount using a filter having a smaller damping ratio than a damping ratio of a pitch motion of the vehicle when the required braking force increases, or generating the braking force command value by performing the filter processing on the required braking force based on the braking operation amount using a filter having a greater damping ratio than the damping ratio of the pitch motion of the vehicle when the required braking force decreases.

4 Claims, 18 Drawing Sheets

BRAKING FORCE CONTROL DEVICE

INCORPORATION BY REFERENCE

The disclosure of Japanese Patent Application No. 2015-086181 filed on Apr. 20, 2015 including the specification, drawings and abstract is incorporated herein by reference in its entirety.

BACKGROUND OF THE INVENTION

1. Field of the Invention

The invention relates to a braking force control device.

2. Description of Related Art

In the related art, brake control using a filter is known. Japanese Patent Application Publication No. 2012-126352 discloses, as this type of brake control, a technique regarding a vehicle brake device including brake operation amount detecting means for outputting the amount of operation of a brake operated by a driver as a detection signal and braking force generating means for generating a vehicle braking force in accordance with a magnitude of the detection signal, the vehicle brake device including a first low-pass filter having a first cut-off frequency in the detection signal, a second low-pass filter having a second cut-off frequency lower than the first cut-off frequency in the detection signal, and braking force target value setting means for generating a braking force target value by selecting the stronger one of an output signal of the first low-pass filter and an output signal of the second low-pass filter and the braking force generating means generating the braking force in accordance with the braking force target value.

There is room for improvement with regard to brake feeling improvement. For example, the brake feeling is reduced if a timing at which the driver senses the brake becoming effective at a time when braking starts is delayed with respect to a timing at which the brake actually becomes effective. The brake feeling can be improved insofar as the driver can promptly sense the brake becoming effective at the time of the start of the braking.

SUMMARY OF THE INVENTION

The invention provides a braking force control device that is capable of brake feeling improvement.

A first aspect of the invention relates to a braking force control device including an actuator configured to control a braking force generated in a vehicle wheel of a vehicle and a control unit configured to output a braking force command value to the actuator. The control unit is configured to perform at least one of the following processes of (i) generating the braking force command value by performing a filter processing on a required braking force based on a braking operation amount using a filter having a smaller damping ratio than a damping ratio of a pitch motion of the vehicle when the required braking force increases, or (ii) generating the braking force command value by performing the filter processing on the required braking force based on the braking operation amount using a filter having a greater damping ratio than the damping ratio of the pitch motion of the vehicle when the required braking force decreases.

By changing the damping ratio of the filter processing and changing a phase of the command value with respect to a phase of the required braking force as described above, the braking force control device described above can improve a brake feeling by, for example, regulating a timing at which a driver senses a brake becoming effective.

A frequency at which a magnitude of a gain reaches a peak in a frequency gain characteristic of the filter processing may be a natural frequency of a pitch motion of the vehicle or a frequency close to the natural frequency of the pitch motion of the vehicle.

In the above-described braking force control device, the gain reaches a peak at the natural frequency of the pitch motion or the frequency close to the natural frequency in the frequency gain characteristic of the filter processing, and thus the pitch motion can be appropriately controlled.

The control unit may be configured to change a phase characteristic with respect to the frequency in the filter processing so as to become a frequency at which an advance amount of the phase reaches its maximum and which is lower than the natural frequency of the pitch motion of the vehicle.

Accordingly, the brake feeling can be improved by the driver being allowed to promptly sense the brake becoming effective.

The control unit may be configured to change a phase characteristic with respect to a frequency in the filter processing so as to become a frequency at which a delay amount of the phase reaches its maximum and which is lower than the natural frequency of a pitch motion of the vehicle when the required braking force decreases.

Accordingly, overshooting of an acceleration generated on the driver's head with respect to a vehicle acceleration is suppressed and the brake feeling can be improved.

A second aspect of the invention relates to a braking force control device including an actuator configured to control a braking force generated in a vehicle wheel of a vehicle and a control unit configured to output a braking force command value to the actuator. The control unit is configured to generate the command value by performing a filter processing on a required braking force based on a braking operation amount, the control unit is configured to cause a phase of the command value to be more advanced than a phase of the required braking force and increase a phase difference between the command value and the required braking force in response to an increase in the required braking force in a case where the required braking force increases, and the control unit is configured to cause the phase of the command value to be more delayed than the phase of the required braking force and increase the phase difference between the command value and the required braking force in response to a decrease in the required braking force in a case where the required braking force decreases.

In the above-described braking force control device, the phase of the command value is more advanced than the phase of the required braking force and the phase difference increases in the case where the required braking force increases. Accordingly, the driver is allowed to promptly sense the brake becoming effective, and the brake feeling is improved. The phase of the command value is more delayed than the phase of the required braking force and the phase difference increases in the case where the required braking force decreases. Accordingly, the overshooting of the acceleration generated on the driver's head with respect to the vehicle acceleration is suppressed and the brake feeling is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a braking force control device according to an embodiment of the invention will be described in detail with reference to accompanying drawings. The invention is not limited to the embodiment. In addition, elements that constitute the following embodiment include elements that can be easily assumed by those skilled in the art or elements that are substantially the same as the elements constituting the following embodiment.

Embodiment

Figure 1:
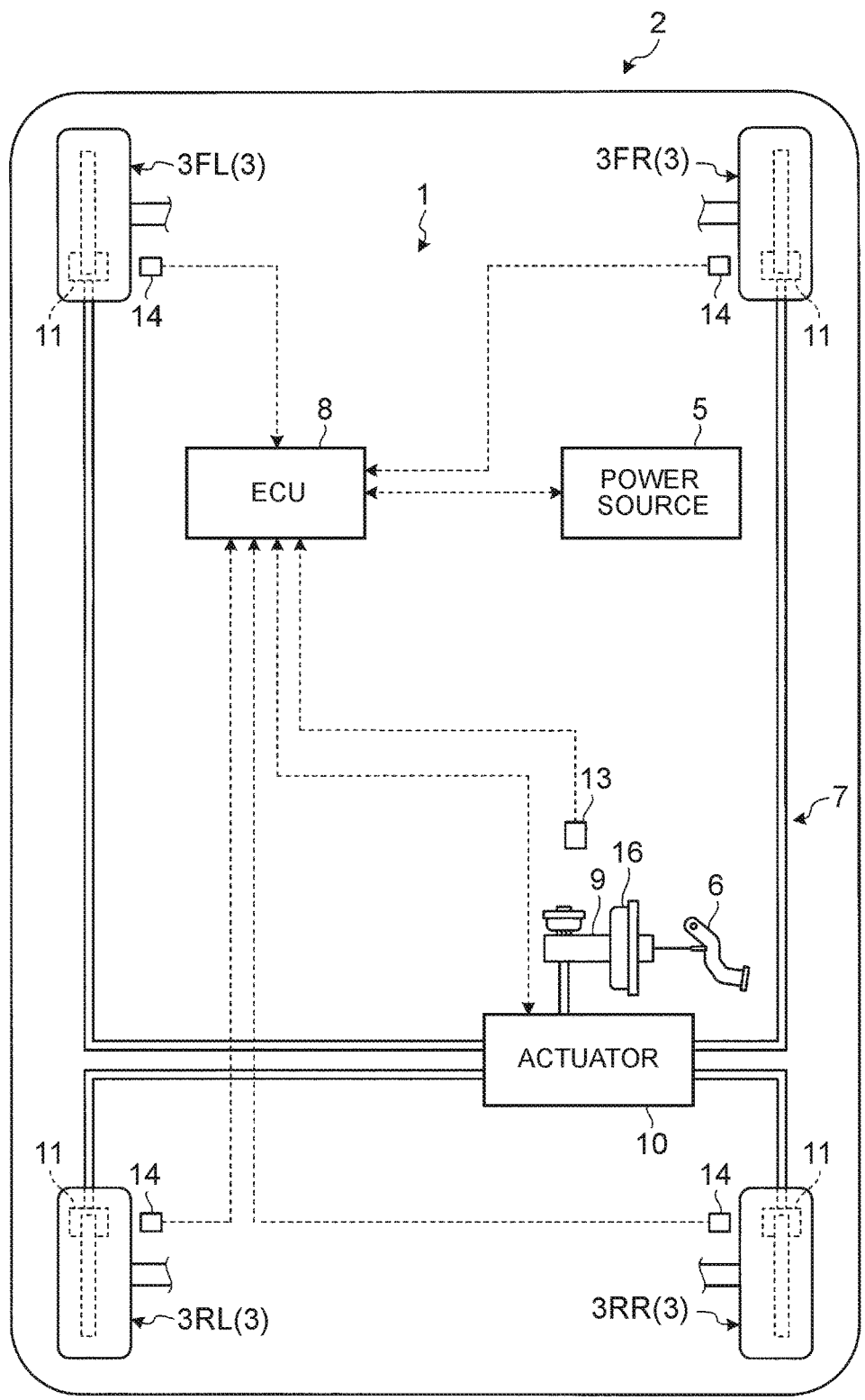
FIG. 1 is a diagram illustrating a schematic configuration of a vehicle according to an embodiment.

The embodiment will be described with reference to FIGS. 1 to 24. This embodiment relates to the braking force control device. FIG. 1 is a diagram illustrating a schematic configuration of a vehicle according to the embodiment of the invention.

A braking force control device 1 according to this embodiment is mounted on a vehicle 2 and controls a braking force that is generated in vehicle wheels 3 of the vehicle 2. The vehicle 2 has a left front wheel 3FL, a right front wheel 3FR, a left rear wheel 3RL, and a right rear wheel 3RR. In this specification, the vehicle wheels 3FL, 3FR, 3RL, 3RR will be simply referred to as the vehicle wheels 3 in a case where the vehicle wheels 3FL, 3FR, 3RL, 3RR are not particularly distinguished.

Figure 2:
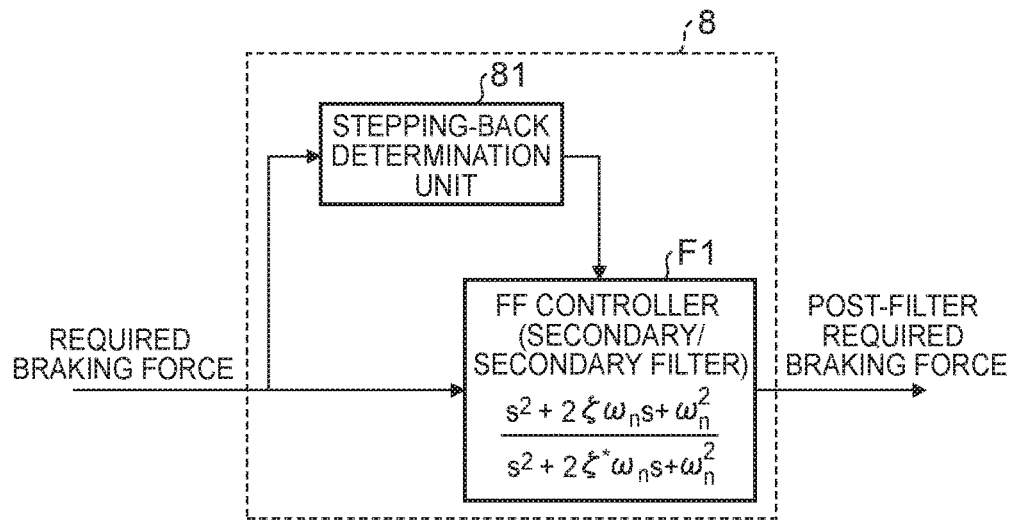
FIG. 2 is a block diagram of an ECU according to the embodiment.

The vehicle 2 has the vehicle wheels 3 and a power source 5 in addition to the braking force control device 1. The braking force control device 1 according to this embodiment includes an ECU 8, a master cylinder pressure sensor 13, and an actuator 10 of a braking device 7. The braking force control device 1 according to this embodiment improves a brake feeling by performing a feedforward (FF) control on a transient posture of the vehicle 2 at a time of braking by using the braking device 7. The ECU 8 has a response compensation filter F1 as illustrated in FIG. 2. The response compensation filter F1 is a secondary/secondary filter that is designed based on a model representing motion characteristics of the vehicle 2. The response compensation filter F1 performs a filter processing on a required braking force and outputs the result to the actuator 10 of the braking device 7 for a damping ratio $\zeta$ of a pitch motion of the vehicle 2 to be a target damping ratio $\zeta^*$. In addition, the ECU 8 changes the target damping ratio $\zeta^*$, which is a transient property adjustment parameter of the response compensation filter F1, in response to a driver's brake operation. In this manner, the braking force control device 1 according to this embodiment can improve the brake feeling by appropriately controlling the posture of the vehicle 2 at a time of braking.

Referring back to FIG. 1, the vehicle 2 generates a driving force by using a torque that is transmitted from the power source 5 to the vehicle wheels 3. Typically, the power source 5 is an internal combustion engine or a motor generator. The power source 5 may be provided with one or both of the internal combustion engine and the motor generator. In addition, the vehicle 2 generates the braking force by the braking device 7 braking rotation of the vehicle wheels 3 in response to the driver's operation of a brake pedal 6.

The braking device 7 includes the brake pedal 6, a booster 16, a master cylinder 9, the actuator 10, and wheel cylinders 11. The booster 16 amplifies an operating force that is input to the brake pedal 6 and transmits the amplified operating force to the master cylinder 9. The master cylinder 9 generates a hydraulic pressure depending on the force that is input from the booster 16. The master cylinder 9 is connected to the wheel cylinders 11 of the respective vehicle wheels 3 via the actuator 10. The actuator 10 is a hydraulic pressure control unit that controls the hydraulic pressure which is supplied to the wheel cylinders 11 of the respective vehicle wheels 3. The actuator 10 controls the braking force that is generated in the vehicle wheels 3 by regulating the supplied hydraulic pressure. The actuator 10 has a pressure regulation function for regulating the hydraulic pressure that is sent from the master cylinder 9 (hereinafter, referred to as a "master cylinder pressure") and supplying the regulated hydraulic pressure to the wheel cylinders 11. In addition, the actuator 10 has a hydraulic pump and has a function for supplying a hydraulic pressure that is higher than the master cylinder pressure to the wheel cylinders 11.

The wheel cylinders 11 brake the rotation of the vehicle wheels 3 by using a friction braking force depending on the hydraulic pressure that is supplied by the actuator 10 (hereinafter, referred to as a "wheel cylinder pressure"). The actuator 10 can individually control the hydraulic pressure that is supplied to the wheel cylinders 11 of the respective vehicle wheels 3FL, 3FR, 3RL, 3RR.

The master cylinder pressure sensor 13 detects the hydraulic pressure of the master cylinder 9. Vehicle wheel speed sensors 14 are placed in the respective vehicle wheels 3FL, 3FR, 3RL, 3RR. The vehicle wheel speed sensors 14 detect a rotation speed of the vehicle wheels 3. Signals that show results of the detection by the master cylinder pressure sensor 13 and the vehicle wheel speed sensors 14 are sent to the ECU 8.

The ECU 8 functions as a control unit that outputs a braking force command value to the actuator 10. Typically, the ECU 8 is an electronic control circuit or an electronic control unit. The ECU 8 according to this embodiment functions to control each section of the vehicle 2. The ECU 8 controls a torque that the power source 5 generates in response to the driver's accelerator operation. In addition, the ECU 8 sends a control command to the actuator 10 in response to the driver's brake operation. The ECU 8 calculates the required braking force based on the master cylinder pressure which is acquired from the master cylinder pressure sensor 13. The required braking force is, for example, a braking force that is generated in the vehicle 2 when the actuator 10 supplies the master cylinder pressure to the wheel cylinders 11 as it is without regulating the master cylinder pressure. In other words, the required braking force is a required braking force depending on the operating force of the driver's braking operation (braking operation amount).

As illustrated in FIG. 2, the ECU 8 according to this embodiment has the response compensation filter F1 and a stepping-back determination unit 81. The ECU 8 performs the filter processing on the required braking force and outputs the result to the actuator 10. This filter-processed required braking force will be referred to as a "post-filter required braking force". The actuator 10 controls the hydraulic pressure supplied to the wheel cylinders 11 of the respective vehicle wheels 3 so that the post-filter required braking force is generated. Filters relating to the filter processing by the ECU 8 according to this embodiment are secondary/secondary filters that include the damping ratio $\zeta$ and the target damping ratio $\zeta^*$. The filter that includes the target damping ratio $\zeta^*$ advances or delays a phase of the post-filter required braking force with respect to a phase of the required braking force. The inventor of this application has found that the brake feeling can be improved by the phase of the post-filter required braking force being appropriately advanced or delayed with respect to the phase of the required braking force as described below.

In an experiment relating to the brake feeling, a phase of the pitch motion of the vehicle 2 was variously changed by an active suspension at a time of braking. The pitch motion of the vehicle 2 in a case where the master cylinder pressure is supplied to the wheel cylinders 11 as it is at the time of the braking will be referred to as an "uncontrolled pitch motion". The phase of the pitch motion was changed to an advance side and a delay side by the active suspension with respect to the phase of the uncontrolled pitch motion, and changes in the brake feeling was evaluated. As a result of the experiment and evaluation, it has been found that the brake feeling improves in a case where the phase of the pitch motion is advanced with respect to the phase of the uncontrolled pitch motion when braking is initiated while the brake feeling improves in a case where the phase of the pitch motion is delayed with respect to the phase of the uncontrolled pitch motion when braking is terminated. This is considered to be for the following reason.

Figure 3:
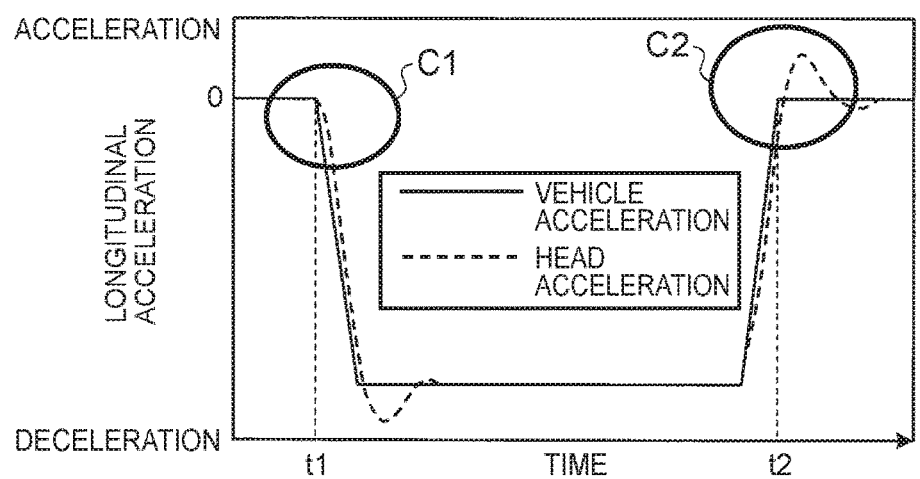
FIG. 3 is a diagram illustrating a vehicle acceleration and a head acceleration at a time of braking.
Figure 4:
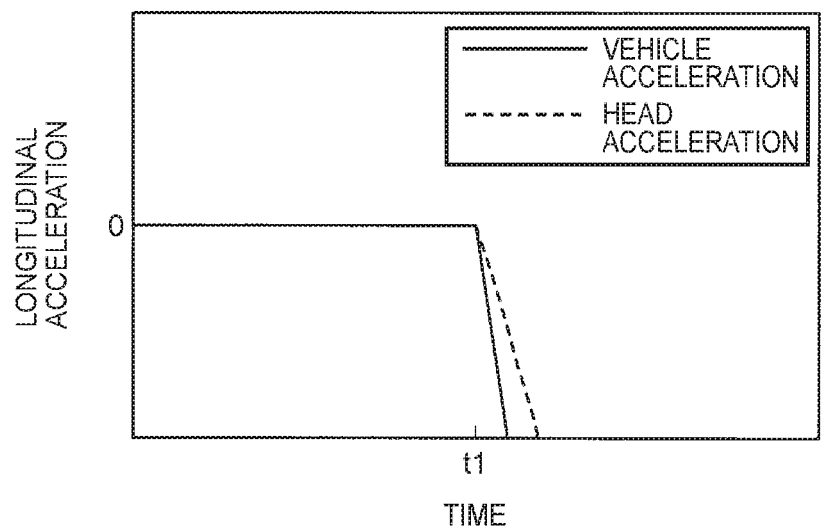
FIG. 4 is a diagram illustrating the vehicle acceleration and the head acceleration at a time of braking initiation.

It is conceivable that the driver senses an acceleration in the vicinity of zero G at the time of the braking with an acceleration generated on the driver's head. In the following description, the acceleration generated on the driver's head will be referred to as a "head acceleration". FIG. 3 shows the vehicle acceleration and the head acceleration at the time of the braking. In normal traveling, the braking starts at time t1 and the braking ends at time t2. FIG. 4 is an enlarged view of a region C1 in FIG. 3, which is the time of the initiation of the braking. At the time of the initiation of the braking, a reduction of the head acceleration is delayed with respect to a reduction of the vehicle acceleration as illustrated in FIG. 4. In other words, the phase of the head acceleration is delayed with respect to the phase of the vehicle acceleration. Accordingly, a timing at which the driver senses a rise in the braking force is later than a timing at which the braking force actually rises. Then, it is conceivable that the brake becoming effective is difficult to grasp. In addition, an absolute value of the head acceleration is lower than an absolute value of the acceleration (braking force) actually generated in the vehicle 2. Accordingly, in a transient state where the vehicle acceleration is on the decline, a deceleration that the driver feels becomes a value on a low deceleration side with respect to an actual deceleration. Due to this divergence, the driver is unlikely to accurately grasp a correspondence relationship between a pedal effort on the brake pedal 6 and the actually generated braking force.

In contrast, the braking force control device 1 according to this embodiment advances the phase of the post-filter required braking force with respect to the phase of the required braking force by the filter processing when the required braking force is on the increase. The brake feeling improves as this filter processing facilitates the grasping of the brake becoming effective and the accurate grasping of the correspondence relationship between the pedal effort and the generated vehicle deceleration.

Figure 5:
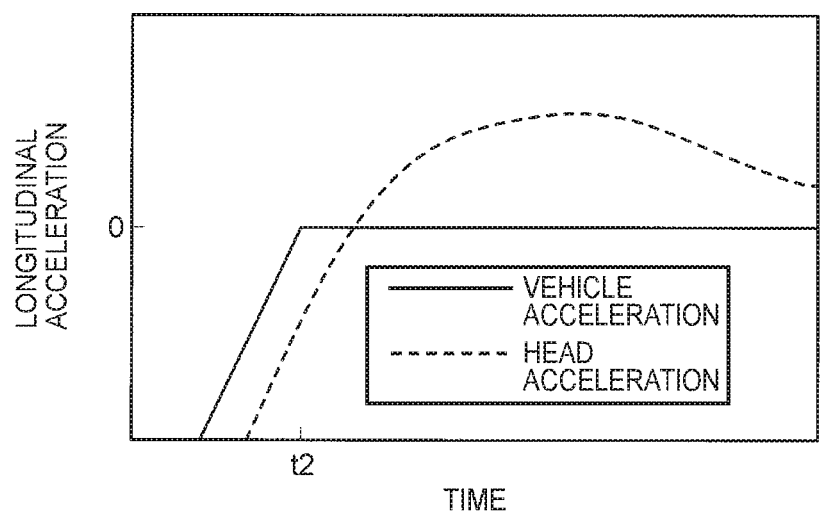
FIG. 5 is a diagram illustrating the vehicle acceleration and the head acceleration at a time of braking termination.

FIG. 5 is an enlarged view of a region C2 in FIG. 3, which is the time of the termination of the braking. As illustrated in FIG. 5, an increase in the head acceleration is delayed with respect to an increase in the vehicle acceleration at the time of the braking termination. The head acceleration continues to increase even after the vehicle acceleration becomes 0 at time t2, and overshoots the vehicle acceleration. It is conceivable that the driver feels uneasy and uncomfortable with this overshoot and this overshoot leads to a reduction of the brake feeling.

In contrast, the braking force control device 1 according to this embodiment delays the phase of the post-filter required braking force with respect to the phase of the required braking force by the filter processing when the required braking force is on the decline. This filter processing inhibits the driver's head acceleration from overshooting the vehicle acceleration and improves the brake feeling.

Figure 6:
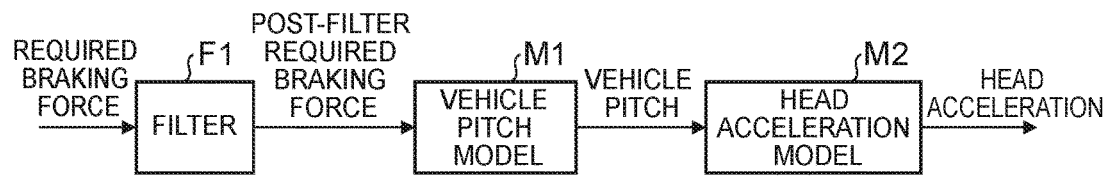
FIG. 6 is a diagram illustrating a vehicle model according to the embodiment.

A filter design of the braking force control device 1 will be described. FIG. 6 is a diagram illustrating a vehicle model according to this embodiment. The vehicle model includes the response compensation filter F1, a vehicle pitch model M1, and a head acceleration model M2. The response compensation filter F1 performs the filter processing on the input required braking force and outputs the post-filter required braking force. The post-filter required braking force is output to the actuator 10 as the braking force command value. The vehicle pitch model M1 is a mathematical model that represents a correspondence relationship between the braking force generated in the vehicle 2 and the pitch motion of the vehicle 2 (such as pitch angle and pitch angular velocity). The pitch motion in a case where the filter processing is performed can be simulated by the post-filter required braking force being input to the vehicle pitch model M1. The head acceleration model M2 is a mathematical model that represents a correspondence relationship between the pitch motion of the vehicle 2 and the head acceleration.

Figure 7:
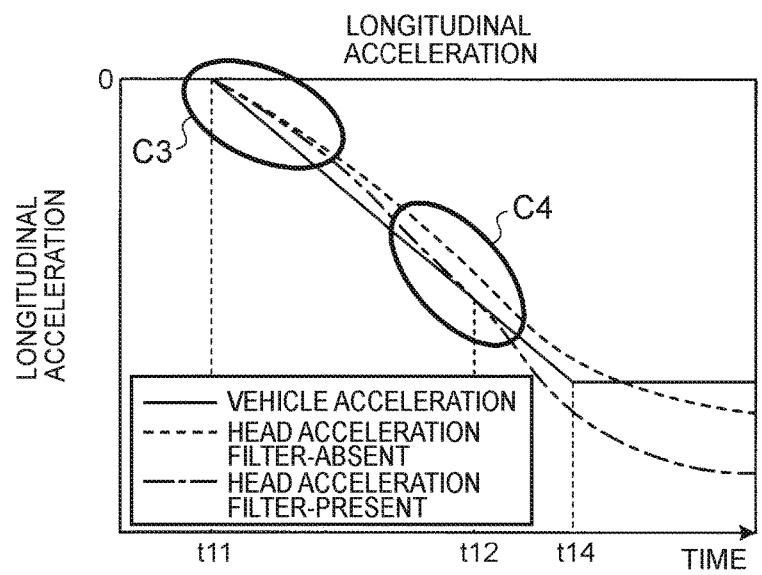
FIG. 7 is an explanatory drawing of a target head acceleration in the case of an increase in a required braking force.
Figure 8:
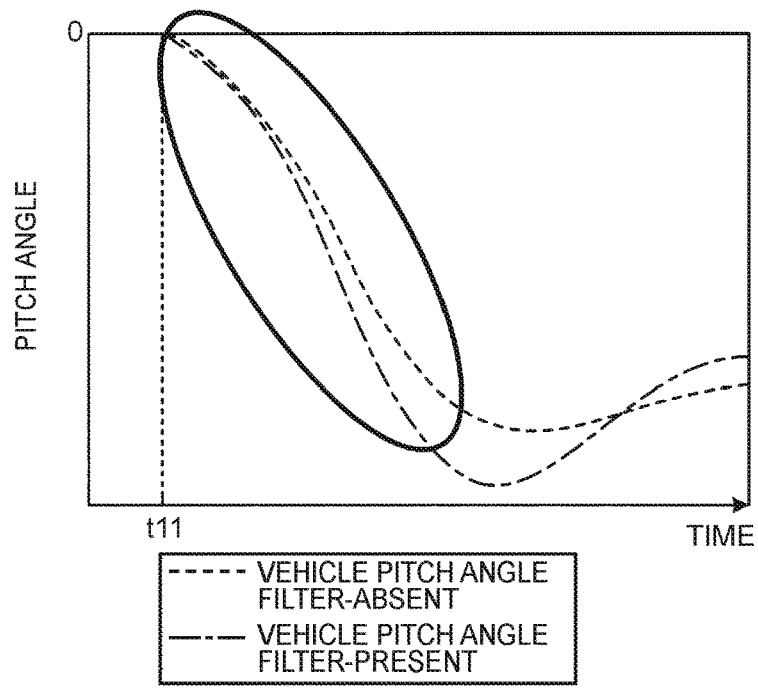
FIG. 8 is an explanatory drawing of a target pitch angle in the case of an increase in the required braking force.

(Lead Filter) A target head acceleration at the time of the braking of the vehicle 2 was determined as a result of a sensory test using the vehicle which is provided with the active suspension. The target head acceleration is a head acceleration with which a good brake feeling can be realized. FIG. 7 is an explanatory drawing of the target head acceleration in the case of an increase in the required braking force, and FIG. 8 is an explanatory drawing of a target pitch angle in the case of an increase in the required braking force. The vehicle acceleration, a filter-absent head acceleration, and a filter-present head acceleration are illustrated in FIG. 7. The filter-absent head acceleration is the head acceleration in a case where the master cylinder pressure is supplied to the wheel cylinders 11 without being regulated. The filter-present head acceleration is a transition of the head acceleration at a time when the good brake feeling was achieved as a result of the sensory test, and is the target head acceleration according to this embodiment.

As illustrated in FIG. 7, the filter-present head acceleration is subjected to a transition with a value similar to that of the filter-absent head acceleration immediately after a braking start time t11 (region C3). Then, as illustrated by a region C4, the filter-present head acceleration diverges toward the advance side with respect to the filter-absent head acceleration. A difference between the filter-present head acceleration and the filter-absent head acceleration gradually expands, and a difference between the filter-present head acceleration and the vehicle acceleration decreases. The filter-present head acceleration corresponds to the vehicle acceleration at time t12, and then the filter-present head acceleration overshoots further on a deceleration side than the vehicle acceleration. In addition, after an increase in the required braking force ends, the filter-present head acceleration has a larger overshoot amount with respect to the vehicle acceleration than the filter-absent head acceleration.

FIG. 8 shows a filter-absent vehicle pitch angle and a filter-present vehicle pitch angle. The filter-absent vehicle pitch angle is a transition of the pitch angle of the vehicle 2 in a case where the master cylinder pressure is supplied to the wheel cylinders 11 without being regulated. The filter-present vehicle pitch angle is a transition of the pitch angle generating the target head acceleration. As illustrated in FIG. 8, the filter-present vehicle pitch angle is advanced in phase with respect to the filter-absent vehicle pitch angle. A difference between the filter-present vehicle pitch angle and the filter-absent vehicle pitch angle expands over time. In other words, the filter-present vehicle pitch angle is subjected to a transition with a value similar to that of the filter-absent vehicle pitch angle immediately after the braking start time t11, and then the filter-present vehicle pitch angle diverges toward the advance side (large pitch angle side) with respect to the filter-absent vehicle pitch angle.

Figure 9:
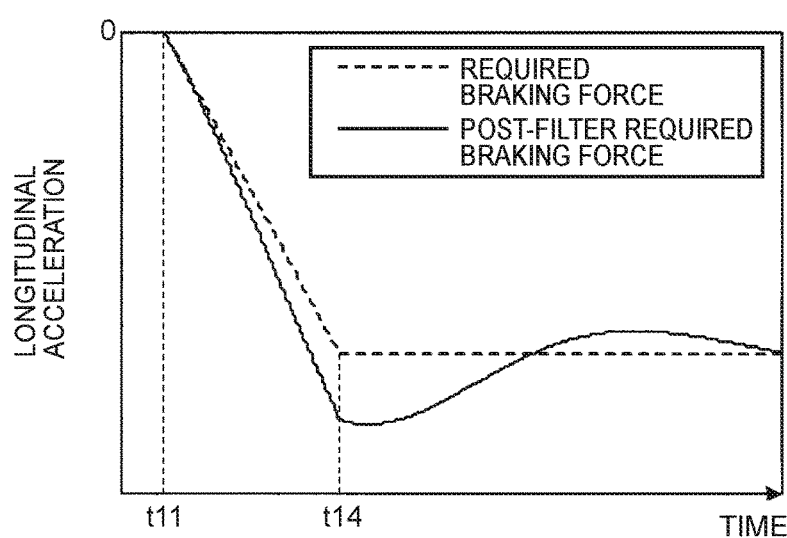
FIG. 9 is a diagram illustrating the required braking force and a post-filter required braking force in the case of an increase in the required braking force.

FIG. 9 shows the required braking force and the post-filter required braking force at a time when the required braking force is on the increase after the initiation of the braking. The horizontal axis in FIG. 9 represents time and the vertical axis in FIG. 9 represents a longitudinal acceleration of the vehicle 2. The required braking force is a negative acceleration in longitudinal acceleration. In other words, an increase in the required braking force means an increase in a required acceleration of the driver in a negative direction. The transition of the required braking force that is illustrated in FIG. 9 has the form of a so-called ramp function. In general, the required braking force resulting from the driver's operation changes in the ramp function in many cases. The required braking force linearly increases from time t11 when the braking operation starts to time t14 when the increase in the required braking force ends. In addition, the required braking force is subjected to a transition with a constant value after time t14. The post-filter required braking force is a value that is generated by the response compensation filter F1, which is determined for the target head acceleration and the target pitch angle to be generated, and is the braking force command value with respect to the actuator 10. The post-filter required braking force is larger than the required braking force. In other words, the phase of the post-filter required braking force is more advanced than the phase of the required braking force.

Figure 10:
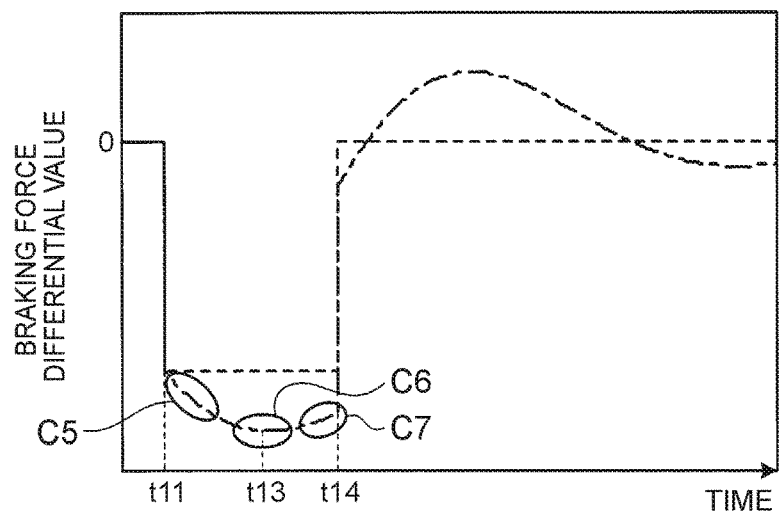
FIG. 10 is a diagram illustrating a braking force differential value in the case of an increase in the required braking force.

Differential values of the respective required braking forces illustrated in FIG. 9 are illustrated in FIG. 10. The differential value of the required braking force is a differential value of the longitudinal acceleration required by the driver. Accordingly, in the case of an increase in the required braking force, the differential value of the required braking force is a negative value. The differential value of the required braking force is a constant value between braking start time t11 and time t14 when the increase in the required braking force ends. In other words, the required braking force increases at a constant rate of increase between braking start time t11 and time t14. In contrast, the differential value of the post-filter required braking force gradually changes from braking start time t11. Specifically, at braking start time t11, the differential value of the post-filter required braking force is equal to the differential value of the required braking force. In an early stage of the increase in the required braking force (region C5), an absolute value of the differential value of the post-filter required braking force gradually increases. In other words, in the early stage of the increase in the required braking force, the post-filter required braking force has an increasing slope and the post-filter required braking force diverges toward a high braking force side with respect to the required braking force.

In a middle stage of the braking force increase (region C6 in FIG. 10), the change in the differential value of the post-filter required braking force becomes gentle and the differential value of the post-filter required braking force becomes an extremely low value at time t13. In a late stage of the braking force increase (region C7 in FIG. 10), the absolute value of the differential value of the post-filter required braking force decrease. As described above, in a transition period when the required braking force is on the increase, the transition of the differential value of the post-filter required braking force draws a curve convex toward the high braking force side. At time t14 when the increase in the required braking force ends, the absolute value of the differential value of the post-filter required braking force is higher than the absolute value of the differential value of the required braking force. Since the absolute value of the differential value of the post-filter required braking force exceeds the absolute value of the differential value of the required braking force during the increase in the required braking force as described above, a phase difference between the post-filter required braking force and the required braking force increases in response to the increase in the required braking force.

As illustrated in FIG. 9, the post-filter required braking force exceeds the required braking force at time t14 and further overshoots toward the high braking force side immediately after time t14. Then, the post-filter required braking force converges toward the differential value of the required braking force.

The early stage, the middle stage, and the late stage of the braking force increase are a period of the increase in the braking force divided into three. For example, the early stage, the middle stage, and the late stage are evenly-divided periods. Although the post-filter required braking force has the increasing slope from the early stage to the middle stage of the braking force increase with respect to the transition of the required braking force illustrated in FIG. 9 as an example, the slope of the post-filter required braking force increases from the early stage to the late stage in some cases depending on a rate of change in the required braking force or the like.

Figure 11:
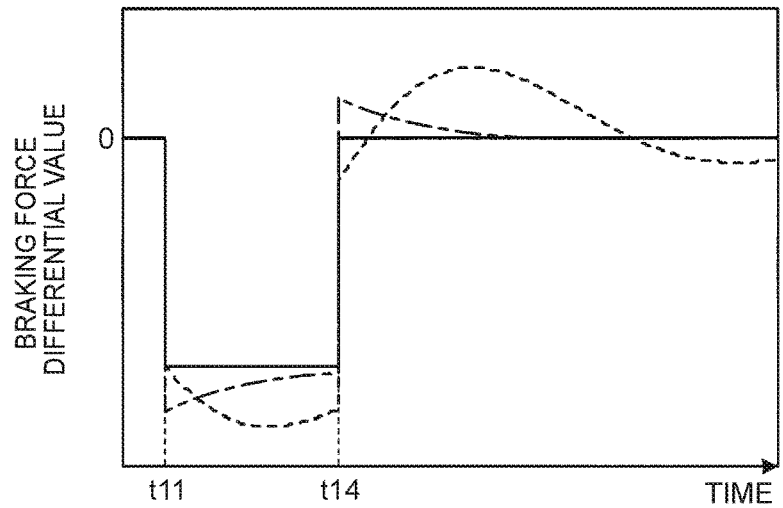
FIG. 11 is a diagram for comparison to a primary lead filter.

The response compensation filter F1 according to this embodiment uses a secondary/secondary filter. The secondary/secondary filter can gradually increase the slope of the post-filter required braking force with respect to the slope of the required braking force in the early stage of the braking force increase (region C5 in FIG. 10). Accordingly, as described with reference to FIG. 11, a rapid rise in the braking force of the vehicle 2 is more suppressed than in a case where a primary filter is used. The differential value of the required braking force (filter-absent), the differential value of the post-filter required braking force (response compensation filter F1 according to the embodiment), and a differential value of the required braking force after a filter processing by a primary lead filter are illustrated in FIG. 11. In a case where the required braking force is filter-processed by the primary lead filter, the differential value of the required braking force after the filter processing becomes a value higher than the differential value of the required braking force and diverged toward a high braking side at braking start time t11 as illustrated in FIG. 11. Accordingly, the braking force rapidly rises at the time of the braking initiation and causes a sudden pitch motion. Then, the driver feels uneasy and the brake feeling is reduced.

In contrast, according to the response compensation filter F1 of this embodiment, the braking force begins to increase as in the filter-absent case at the time of the start of the braking, and then the braking force increases at a higher rate than in the filter-absent case. As the phase of the post-filter required braking force is advanced with respect to the phase of the required braking force, the pitch motion of the vehicle 2 is put ahead, and this allows the driver to appropriately and accurately sense the braking force in the early stage of the braking and the brake becoming effective.

Figure 12:
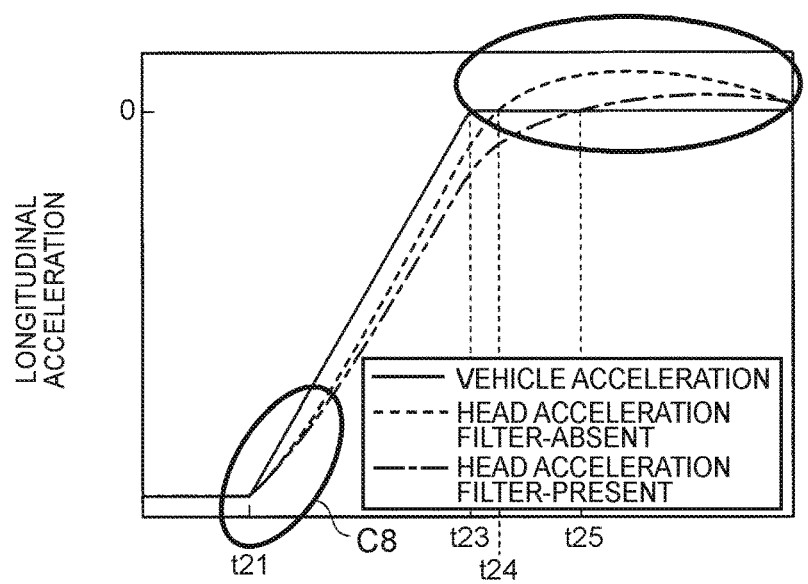
FIG. 12 is an explanatory drawing of the target head acceleration in the case of a decrease in the required braking force.
Figure 13:
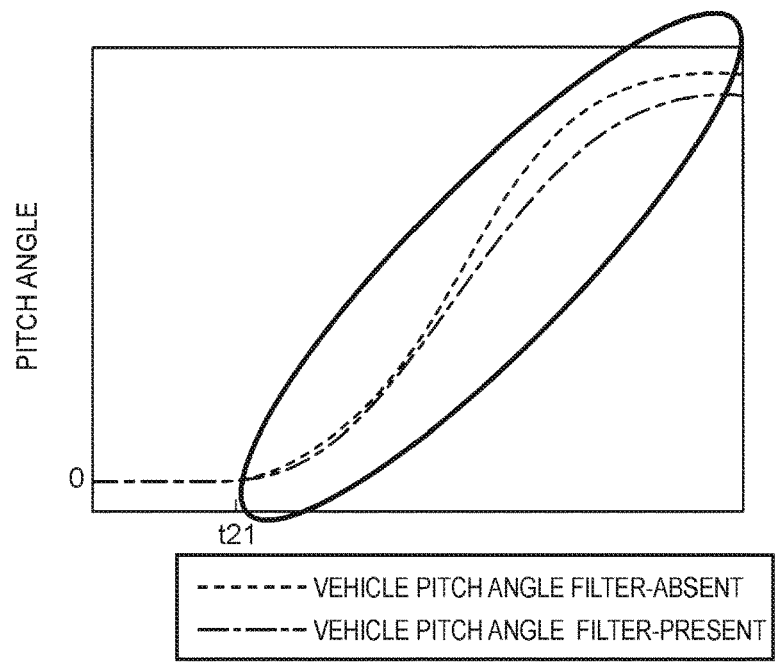
FIG. 13 is an explanatory drawing of the target pitch angle in the case of a decrease in the required braking force.

(Delay Filter At Time Of Decrease in Required Braking Force) Hereinafter, a filter property at a time when the required braking force is on the decrease will be described. FIG. 12 is an explanatory drawing of the target head acceleration in the case of a decrease in the required braking force, and FIG. 13 is an explanatory drawing of the target pitch angle in the case of a decrease in the required braking force. The vehicle acceleration, the filter-absent head acceleration, and the filter-present head acceleration are illustrated in FIG. 12. The filter-present head acceleration is the target head acceleration according to this embodiment.

As illustrated in FIG. 12, the filter-present head acceleration is subjected to a transition with a value similar to that of the filter-absent head acceleration immediately after time t21 when the required acceleration begins to decrease (region C8). Then, the filter-present head acceleration diverges toward the delay side (high deceleration side) with respect to the filter-absent head acceleration. The difference between the filter-present head acceleration and the filter-absent head acceleration gradually expands. At time t23, the decrease in the required braking force ends and the required braking force becomes 0. In comparison to the filter-absent head acceleration, the filter-present head acceleration has a suppressed overshoot amount with respect to the vehicle acceleration. In addition, a timing at which the filter-present head acceleration exceeds the vehicle acceleration (time t25) is later than a timing at which the filter-absent head acceleration exceeds the vehicle acceleration (time t24). The brake feeling is improved by the reduction of the overshoot amount and the delay of the overshoot timing.

The filter-present vehicle pitch angle that is illustrated in FIG. 13 is a transition of the pitch angle generating the target head acceleration in a transient state where the required braking force decreases. As illustrated in FIG. 13, the filter-present vehicle pitch angle is delayed in phase with respect to the filter-absent vehicle pitch angle. The difference between the filter-present vehicle pitch angle and the filter-absent vehicle pitch angle expands over time from a required braking force decrease start time t21. Immediately after time t21, the filter-present vehicle pitch angle is subjected to a transition with a value similar to that of the filter-absent vehicle pitch angle. Then, the filter-present vehicle pitch angle diverges toward the delay side (small pitch angle side) with respect to the filter-absent vehicle pitch angle.

Figure 14:
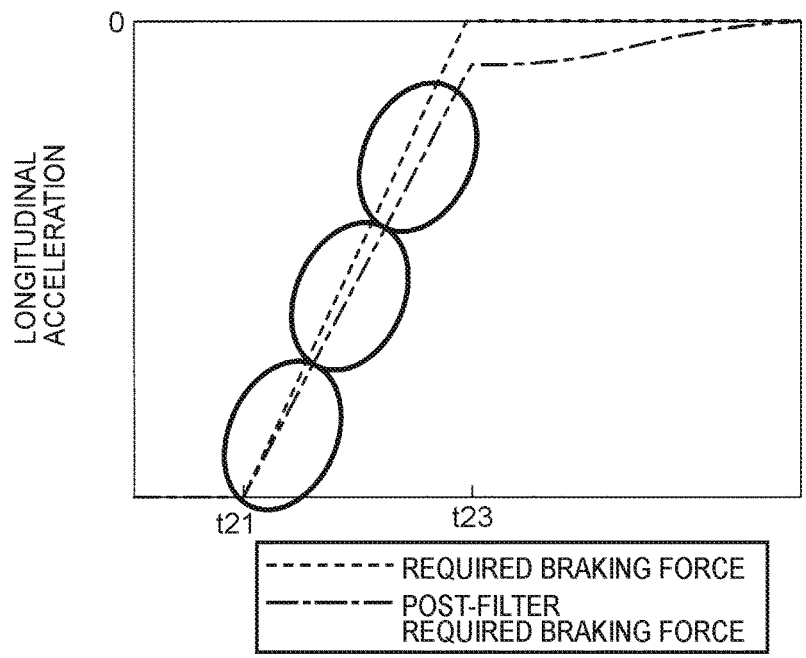
FIG. 14 is a diagram illustrating the required braking force and the post-filter required braking force in the case of a decrease in the required braking force.

The required braking force and the post-filter required braking force at a time of a decrease in the required braking force are illustrated in FIG. 14. In FIG. 14, the required braking force begins to decrease at time t21, and the required braking force becomes 0 at time t23. In FIG. 14, the required braking force decreases at a constant rate of decrease from time t21 to time t23. As illustrated in FIG. 14, the post-filter required braking force is larger than the required braking force. In other words, the phase of the post-filter required braking force is more delayed than the phase of the required braking force.

Figure 15:
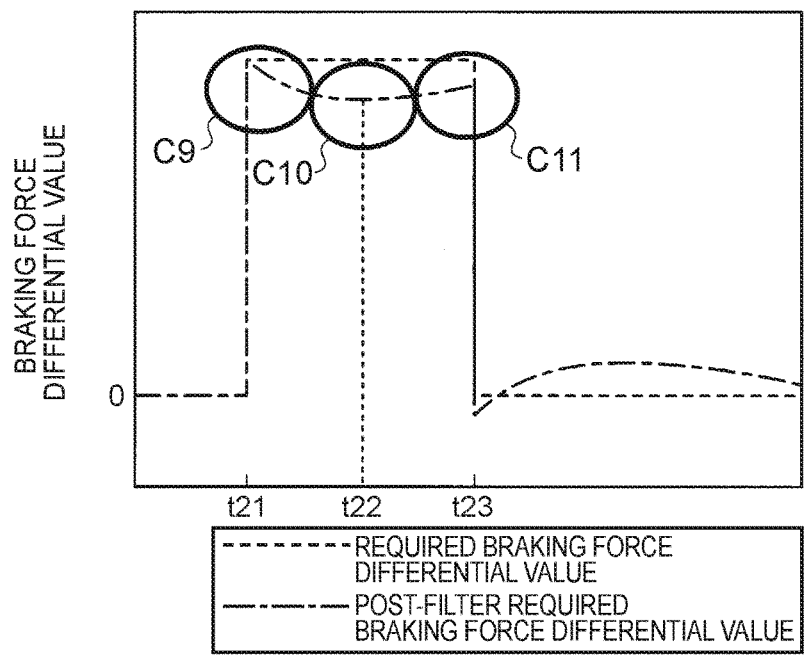
FIG. 15 is a diagram illustrating the braking force differential value in the case of a decrease in the required braking force.

Differential values of the respective braking forces illustrated in FIG. 14 are illustrated in FIG. 15. The differential value of the required braking force is a constant value between time t21 when the required braking force begins to decrease and time t23 when the decrease in the required braking force ends. The differential value of the post-filter required braking force gradually changes from time t21. Specifically, at time t21, the differential value of the post-filter required braking force is equal to the differential value of the required braking force. In an early stage of the decrease in the required braking force (region C9), the differential value of the post-filter required braking force gradually decreases. In other words, in the early stage of the decrease in the required braking force, the post-filter required braking force has a decreasing slope and the post-filter required braking force diverges toward the high braking force side with respect to the required braking force.

In a middle stage of the decrease in the required braking force (region C10 in FIG. 15), the decrease in the differential value of the post-filter required braking force becomes gentle and the differential value of the post-filter required braking force becomes an extremely low value at time t22. In a late stage of the decrease in the required braking force (region C11), the differential value of the post-filter required braking force increases. As described above, in a transition period when the required braking force is on the decrease, the transition of the differential value of the post-filter required braking force draws a curve convex toward the low braking side. At time t23 when the decrease in the required braking force is completed, the absolute value of the differential value of the post-filter required braking force is lower than the absolute value of the differential value of the required braking force. Since the absolute value of the differential value of the post-filter required braking force falls short of the absolute value of the differential value of the required braking force during the decrease in the required braking force as described above, the phase difference between the post-filter required braking force and the required braking force increases in response to the decrease in the required braking force. As illustrated in FIG. 14, the post-filter required braking force exceeds the required braking force at time t23. After time t23, the post-filter required braking force gradually decreases toward the required braking force.

Figure 16:
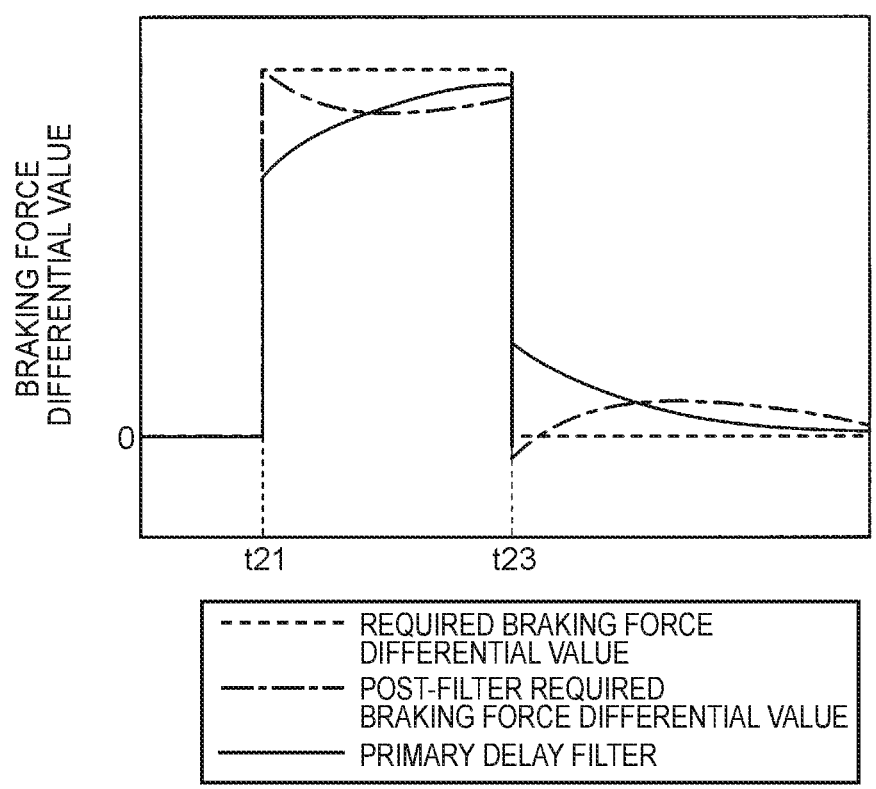
FIG. 16 is a diagram for comparison to a primary delay filter.

A difference between the response compensation filter F1 according to this embodiment and a primary delay filter will be described with regard to a case where the required braking force is on the decrease. The differential value of the required braking force (filter-absent), the differential value of the post-filter required braking force (response compensation filter F1 according to the embodiment), and a differential value of the required braking force after a filter processing by the primary delay filter are illustrated in FIG. 16. In a case where the required braking force is filter-processed by the primary delay filter, the differential value of the required braking force after the filter processing becomes a value higher than the differential value of the required braking force and diverged toward the high braking side at time t21 when the required braking force begins to decrease as illustrated in FIG. 16. Accordingly, the pitch motion of the vehicle 2 is delayed with respect to a returning operation of the brake pedal 6, which leads to a reduction of responsiveness. In addition, in the case of the primary delay filter, the differential value of the required braking force after the filter processing uniformly increases toward the differential value of the required braking force over time. This property of the primary delay filter causes a problem that the slope of the required braking force at the time of the initiation of the decrease (time t21) becomes even smaller than the slope of the required braking force at the time of the braking termination (time t23). Accordingly, the primary delay filter cannot appropriately suppress the overshooting of the head acceleration at a time when the required braking force becomes 0, and a desired brake feeling cannot be realized with the primary delay filter.

In contrast, according to the response compensation filter F1 of this embodiment, the slope at the time of the termination of the decrease in the required braking force (time t23) can be regulated without the slope at the time of the initiation of the decrease in the required braking force (time t21) being affected. Accordingly, the desired brake feeling can be easily realized.

Figure 17:
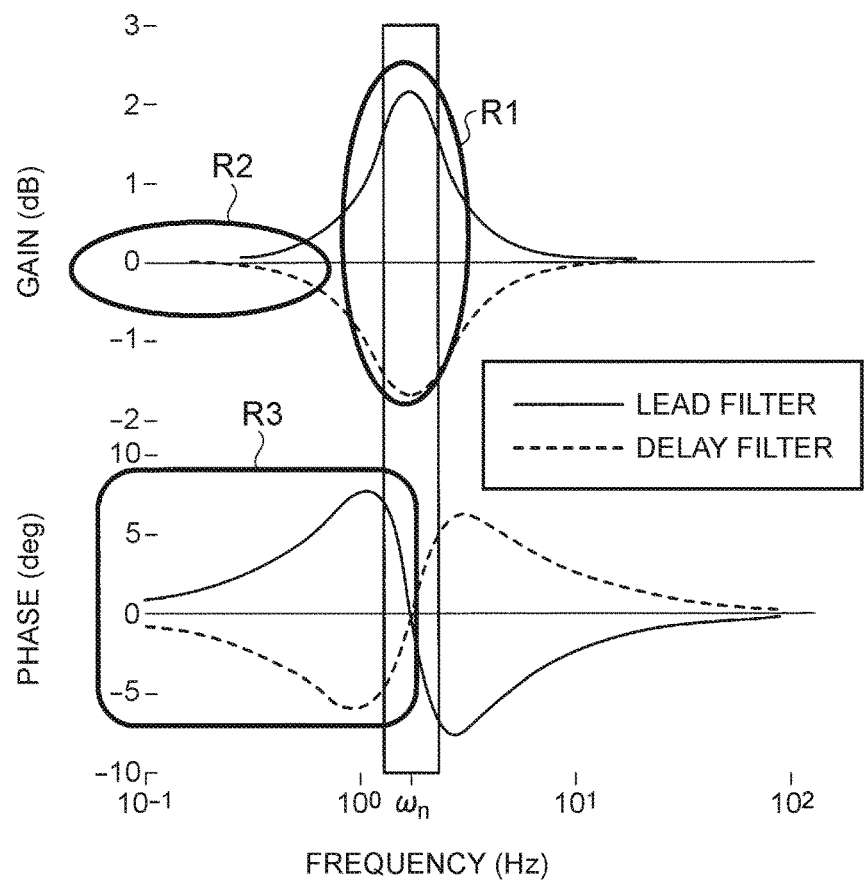
FIG. 17 is a bode diagram of a response compensation filter according to the embodiment.
Figure 18:
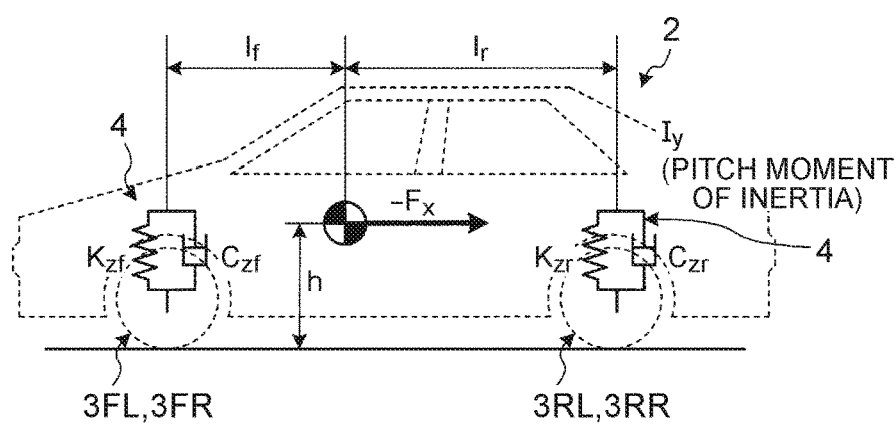
FIG. 18 is an explanatory drawing of a sprung pitch model of one degree of freedom.

(Response Compensation Filter Design Example) An example of a filter property and an example of a filter design method will be described with regard to the response compensation filter F1 according to this embodiment. FIG. 17 is a bode diagram of the response compensation filter F1 according to this embodiment, and FIG. 18 is an explanatory drawing of a sprung pitch model of one degree of freedom. As illustrated in FIG. 18, the front wheels 3FL, 3FR and the rear wheels 3RL, 3RR of the vehicle 2 support a sprung mass via suspensions 4. The suspensions 4 have springs and dampers that are connected in parallel to each other. In the suspension 4 of the front wheels 3FL, 3FR, the spring coefficient of the spring is $K_{zf}$ and the damping coefficient of the damper is $C_{zf}$. In the suspension 4 of the rear wheels 3RL, 3RR, the spring coefficient of the spring is $K_{zr}$ and the damping coefficient of the damper is $C_{zr}$. The ground height of the center-of-gravity position of the vehicle 2 is h, the distance from the center-of-gravity position to the suspension 4 of the front wheels 3FL, 3FR is $l_f$, and the distance from the center-of-gravity position to the suspension 4 of the rear wheels 3RL, 3RR is $l_r$. The braking force generated in the vehicle 2 is $F_x$, and the pitch moment of inertia of the vehicle 2 is $I_y$. The following Equation (I) is satisfied from the sprung pitch model of one degree of freedom that is illustrated in FIG. 18. θ is the pitch angle of the vehicle 2, and the dot (•) on the letter is a differential symbol.

$$I_y\ddot{\theta} = -(l_f^2 C_{zf} + l_r^2 C_{zr})\dot{\theta} - (l_f^2 K_{zf} + l_r^2 K_{zr})\theta - hF_x \quad (I)$$

The transfer function G(s) from the braking force $F_x$ to the pitch angle θ is represented by the following Equation (II). ζ is the damping ratio of the sprung pitch model of one degree of freedom, and $\omega_n$ is the natural frequency of the pitch motion of the vehicle 2. As is apparent from Equation (II), the transient property of the pitch motion with respect to the braking force $F_x$ is expressed by the damping ratio ζ and the natural frequency $\omega_n$.

$$G(s) = G(0)\frac{\omega_n^2}{s^2 + 2\zeta\omega_n s + \omega_n^2} \quad (II)$$

$$G(0) = -\frac{h}{K_\theta},$$

$$\omega_n = \sqrt{\frac{K_\theta}{I_y}},$$

-continued $$\zeta = \frac{C_\theta}{2}\sqrt{\frac{1}{I_y K_\theta}},$$

$$C_\theta = l_f^2 C_{zf} + l_r^2 C_{zr},$$

$$K_\theta = l_f^2 K_{zf} + l_r^2 K_{zr}$$

Figure 19:
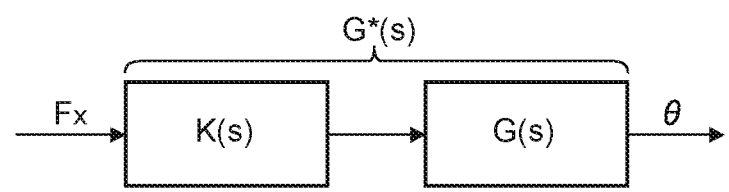
FIG. 19 is a diagram illustrating a transfer function of the embodiment.

In this embodiment, a transfer function G*(s) with a target transfer characteristic is realized by the function K(s) of the response compensation filter F1 being added ahead of the natural transfer function G(s) of the vehicle 2 as illustrated in FIG. 19. The target transfer function is the following Equation (III). ζ* is the target damping ratio. The function K(s) of the response compensation filter F1 is the following Equation (IV). As shown in Equation (IV), the function K(s) of the response compensation filter F1 is a secondary/secondary filter in which each of the denominator and the numerator is a quadratic equation. The phase of the pitch angle θ is delayed with respect to the phase of the filter-absent pitch angle θ when the target damping ratio ζ* is allowed to exceed the damping ratio ζ of the pitch motion of the vehicle 2, and the phase of the pitch angle θ is advanced with respect to the phase of the filter-absent pitch angle θ when the target damping ratio ζ* is allowed to fall short of the damping ratio ζ of the pitch motion of the vehicle 2. The value of the target damping ratio ζ* is determined such that the target head acceleration can be realized, and the function K(s) of the response compensation filter F1 is determined by the determined ζ*.

$$G^*(s) = G(0)\frac{\omega_n^2}{s^2 + 2\zeta^*\omega_n s + \omega_n^2} \quad (III)$$

$$K(s) = \frac{G^*(s)}{G(s)} = \frac{s^2 + 2\zeta\omega_n s + \omega_n^2}{s^2 + 2\zeta^*\omega_n s + \omega_n^2} \quad (IV)$$

The bode diagram illustrated in FIG. 17 shows the determined property of the response compensation filter F1. The upper section of FIG. 17 shows a gain characteristic with respect to the frequency in the filter processing by the response compensation filter F1, and the lower section of FIG. 17 shows a phase characteristic with respect to the frequency in the filter processing by the response compensation filter F1. The line of the lead filter in FIG. 17 shows the characteristic of the response compensation filter F1 that is applied when the required braking force increases. The characteristic of the lead filter is a characteristic allowing the target damping ratio ζ* to fall short of the target damping ratio ζ of the pitch motion of the vehicle 2. The line of the delay filter shows the characteristic of the response compensation filter F1 that is applied when the required braking force decreases. The characteristic of the delay filter is a characteristic allowing the target damping ratio ζ* to exceed the target damping ratio ζ of the pitch motion of the vehicle 2. In other words, in this embodiment, the characteristics of the response compensation filter F1 are switched when the required braking force increases and when the required braking force decreases.

Frequency-gain characteristics of the respective filters will be described. The lead filter has a gain reaching a maximum value (peak) at the natural frequency $\omega_n$ of the pitch motion (refer to a region R1). The delay filter has a gain reaching a minimum value (peak with the highest absolute value) at the natural frequency $\omega_n$ of the pitch motion. In the lead filter and the delay filter, the gain is 0 in a region of a low frequency equal to or lower than a certain level with respect to the natural frequency $\omega_n$ (region on the low-frequency side of a region R2) and a region of a high frequency equal to or higher than a certain level. Accordingly, the response compensation filter F1 does not change the required braking force with regard to a steady braking force (0 frequency). In FIG. 17, the natural frequency $\omega_n$ is 1.72 [Hz].

Frequency-phase characteristics of the respective filters will be described. The lead filter is a positive value (value on a phase advance side) in a region (region R3) further on the low-frequency side than the natural frequency $\omega_n$. The line that shows the phase characteristic of the lead filter is shaped to be convex toward the phase advance side in the frequency region at or below the natural frequency $\omega_n$, and the frequency at which the advance amount of the phase reaches its maximum is lower than the natural frequency $\omega_n$. In other words, the phase characteristic of the lead filter has an extremely high value at a frequency lower than the natural frequency $\omega_n$. The delay filter is a negative value (value on a phase delay side) in the region further on the low-frequency side than the natural frequency $\omega_n$. The line that shows the phase characteristic of the delay filter is shaped to be convex toward the phase delay side in the frequency region at or below the natural frequency $\omega_n$, and the frequency at which the delay amount of the phase reaches its maximum is lower than the natural frequency $\omega_n$. In other words, the phase characteristic of the delay filter has an extremely low value at the frequency lower than the natural frequency $\omega_n$.

The filter property switching of the response compensation filter F1 will be described. The stepping-back determination unit 81 that is illustrated in FIG. 2 determines whether the brake pedal 6 is in a pedal depression-increasing state where the brake pedal 6 is depressed and a pedal return state where the brake pedal 6 returns based on the transition of the required braking force. The stepping-back determination unit 81 outputs the determination result of whether the brake pedal 6 is in the pedal depression-increasing state or the pedal return state to the response compensation filter F1. The response compensation filter F1 switches the filter property to the lead filter or the delay filter in accordance with the result of the determination by the stepping-back determination unit 81. Upon the pedal depression-increasing state being determined, the response compensation filter F1 sets the filter property to the lead filter property. Upon the pedal return state being determined, the response compensation filter F1 sets the filter property to the delay filter property. In this manner, the ECU 8 switches the characteristic of the filter processing to the delay filter property or the lead filter property in accordance with the direction of change (increase and decrease) in the braking operation amount. It is preferable that the determination by the stepping-back determination unit 81 is provided with a hysteresis so that filter property hunting is suppressed.

Example

Figure 20:
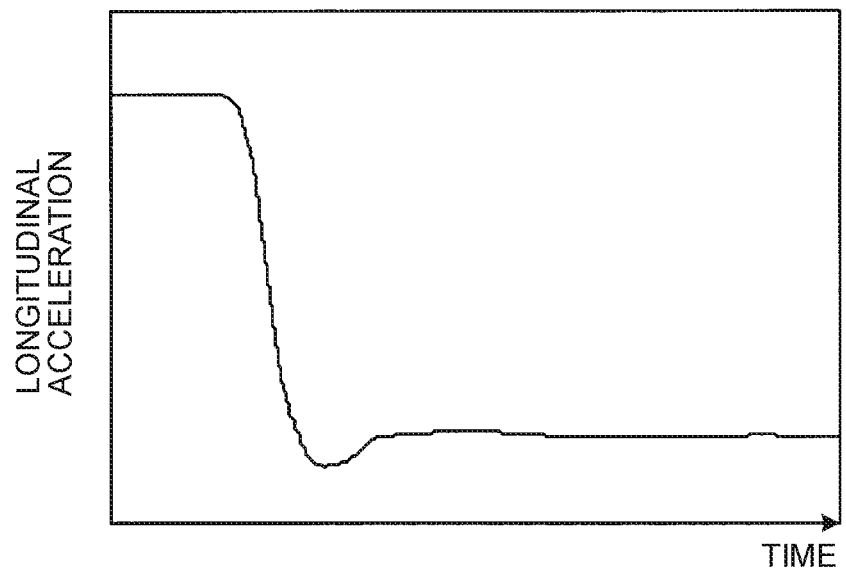
FIG. 20 is a diagram illustrating a transition of the required braking force based on the amount of a driver's braking operation.
Figure 21:
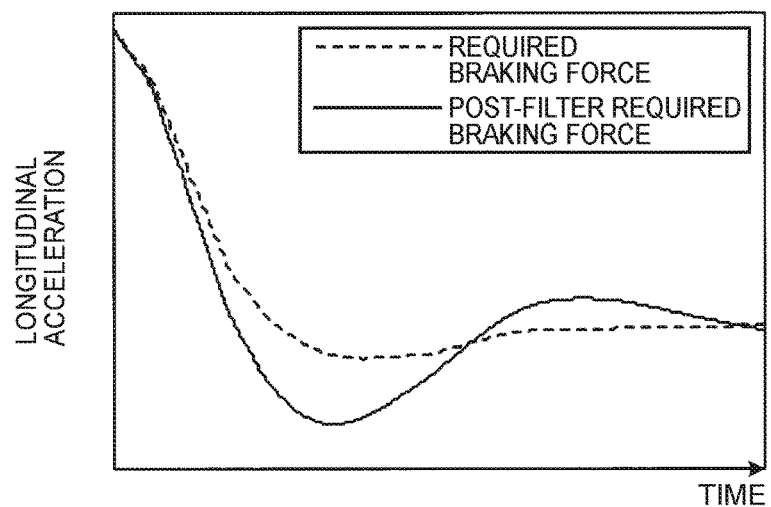
FIG. 21 is an enlarged view of a required braking force and a post-filter required braking force according to an example.
Figure 22:
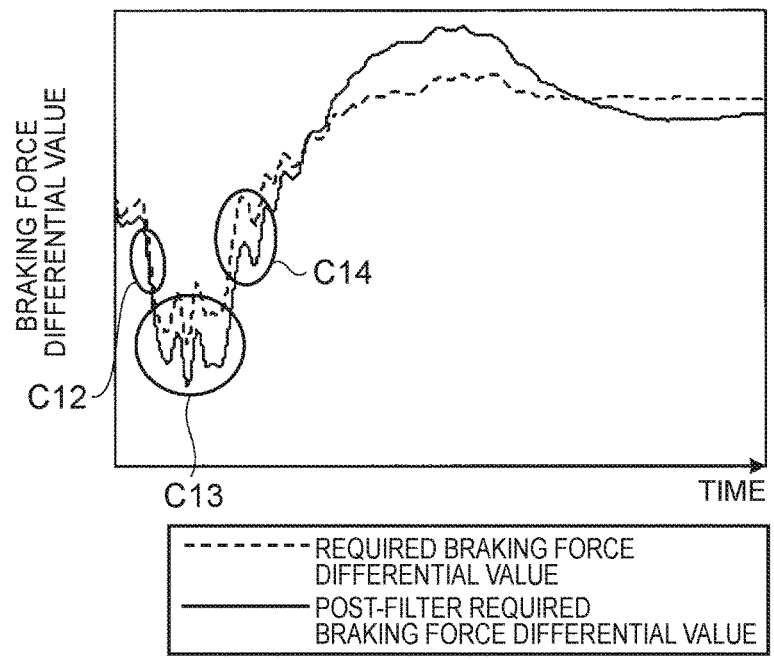
FIG. 22 is a diagram illustrating a required braking force differential value according to the example.

An example of the operation of the response compensation filter F1 with respect to the driver's actual braking operation will be described. FIG. 20 shows the transition of the required braking force based on the amount of the driver's braking operation. In FIG. 21, the required braking force illustrated in FIG. 20 and the post-filter required braking force with respect to this required braking force are illustrated in an enlarged manner. It can be seen that the phase of the post-filter required braking force is advanced with respect to the phase of the required braking force in a period when the required braking force increases. The differential value of the required braking force and the differential value of the post-filter required braking force are illustrated in FIG. 22. As illustrated in FIG. 22, the differential value of the post-filter required braking force is lower than the differential value of the required braking force. In other words, the slope of the post-filter required braking force is larger than the slope of the required braking force. In addition, in the early stage of the increase in the required braking force (region C12), the differential value of the post-filter required braking force is subjected to a transition with a value similar to that of the differential value of the required braking force. In the middle stage of the increase in the required braking force (region C13), the difference between the differential value of the post-filter required braking force and the differential value of the required braking force increases. In the late stage of the increase in the required braking force (region C14), the difference between the differential value of the post-filter required braking force and the differential value of the required braking force decreases. According to the above description, it has been confirmed that the post-filter required braking force can be subjected to an intended transition with respect to the driver's actual braking operation by the response compensation filter F1.

Figure 23:
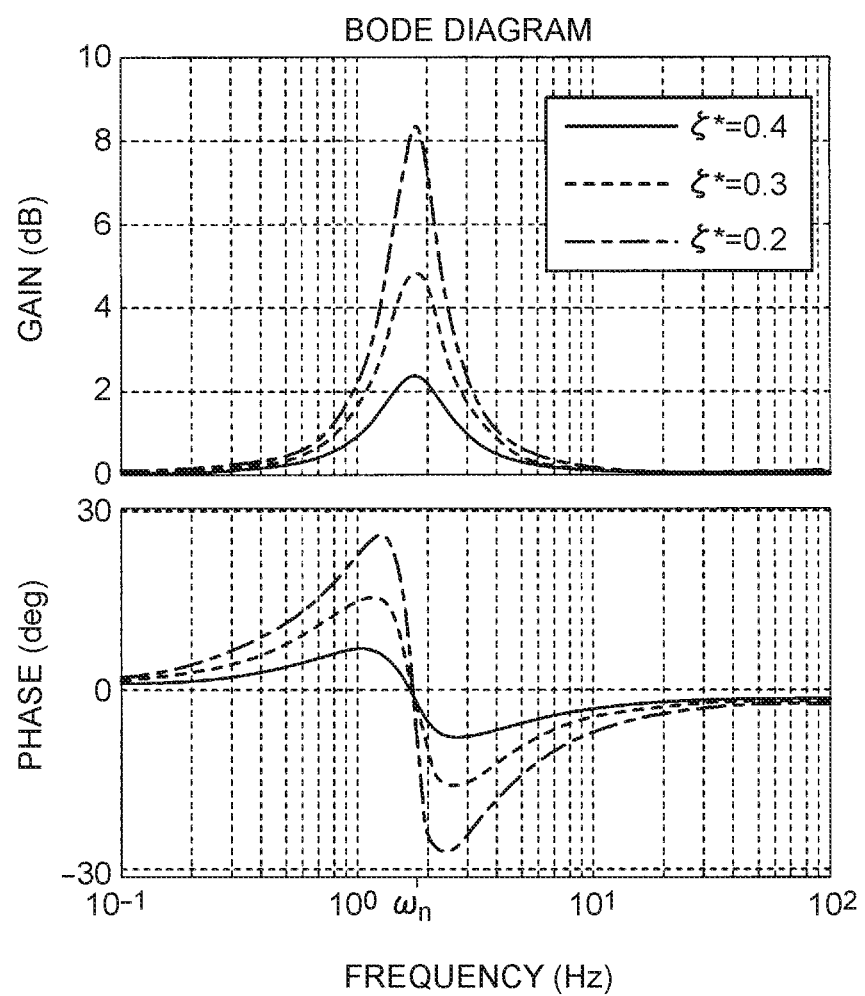
FIG. 23 is a diagram showing a lead filter property change.

Hereinafter, a change in the property of the response compensation filter F1 depending on the target damping ratio $\zeta^*$ will be described. FIG. 23 is a diagram showing the lead filter property change. FIG. 23 shows the lead filter property in a case where the damping ratio $\zeta$ of the pitch motion of the vehicle 2 is 0.5. It can be seen that the gain of the filter increases as the value of the target damping ratio $\zeta^*$ is reduced with respect to the damping ratio $\zeta$. In addition, it can be seen that the advance amount of the phase increases in a frequency region at or below the natural frequency $\omega_n$ as the value of the target damping ratio $\zeta^*$ is reduced.

Figure 24:
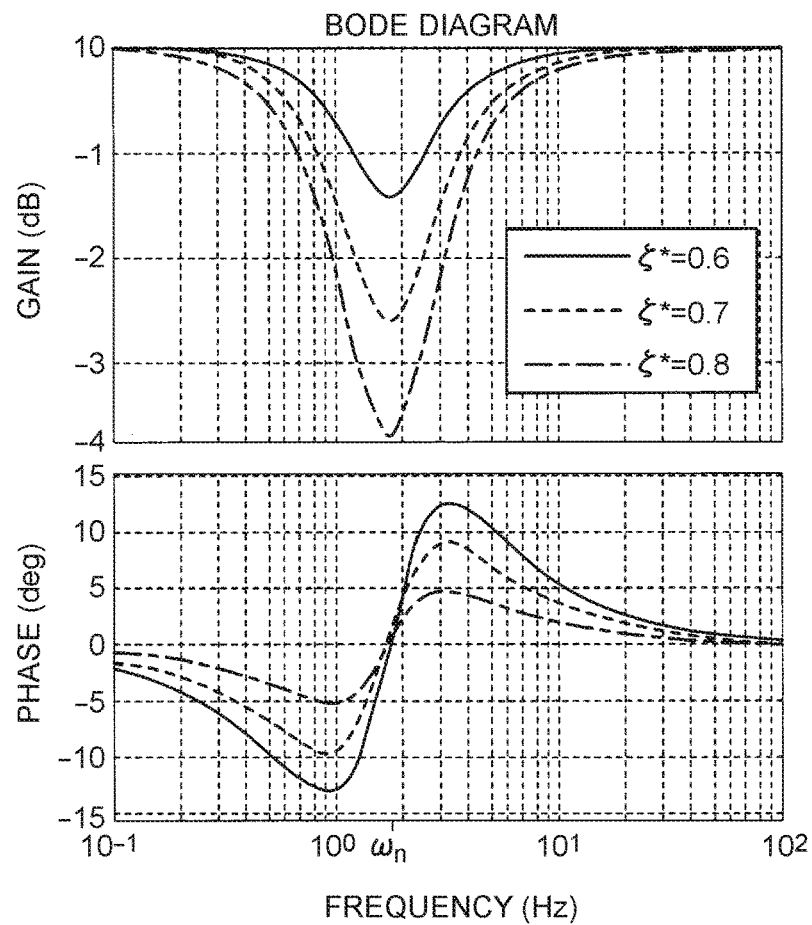
FIG. 24 is a diagram showing a delay filter property change.

FIG. 24 is a diagram showing the delay filter property change. FIG. 24 shows the delay filter property in a case where the damping ratio $\zeta$ of the pitch motion of the vehicle 2 is 0.5. It can be seen that the absolute value of the gain increases as the value of the target damping ratio $\zeta^*$ is increased with respect to the damping ratio $\zeta$. In addition, it can be seen that the delay amount of the phase increases in the frequency region at or below the natural frequency $\omega_n$ as the value of the target damping ratio $\zeta^*$ is increased.

Regarding the adjustment of the filter property of the response compensation filter F1, the range of the change in the target damping ratio $\zeta^*$ is $0<\zeta^*\leq 1$. It is preferable that the range is $0.1\leq\zeta^*\leq 0.9$.

As described above, the ECU 8 of the braking force control device 1 according to this embodiment generates the post-filter required braking force (command value) by performing the filter processing on the required braking force based on the braking operation amount and changes the target damping ratio $\zeta^*$ (damping ratio of the filter processing) in response to a change in the required braking force. The ECU 8 according to this embodiment changes the target damping ratio $\zeta^*$ in accordance with an increase/decrease in the required braking force. By changing the target damping ratio $\zeta^*$, the ECU 8 can improve the brake feeling by regulating the timing at which the driver senses the brake becoming effective, reducing the difference between the braking force sensed by the driver and the actual braking force, suppressing the overshooting of the head acceleration with respect to the vehicle acceleration, and the like.

The braking force control device 1 according to this embodiment controls the transient posture of the vehicle 2 at a time of braking by the FF control of the braking device 7. With the FF control according to this embodiment, the control of the posture of the vehicle 2 can be performed based on the driver's operation that does not cause a problem associated with a feedback control (sensor noise, hunting, delay, and the like). The brake feeling can be appropriately improved since the posture of the vehicle 2 is controlled based on the amount of the driver's braking operation.

In this embodiment, the frequency at which the magnitude of the gain reaches a peak in the frequency gain characteristic of the filter processing is the natural frequency $\omega_n$ of the pitch motion of the vehicle 2 as illustrated in FIG. 17. Since the gain reaches a peak at the natural frequency $\omega_n$ of the pitch motion in the frequency gain characteristic, the pitch motion can be appropriately controlled.

In this embodiment, the phase characteristic with respect to the frequency in the filter processing has an extreme value at a frequency lower than the natural frequency $\omega_n$ of the pitch motion of the vehicle 2. This phase characteristic allows the phase of the post-filter required braking force to be changed toward the advance side or the delay side with respect to the phase of the required braking force.

In the case of an increase in the required braking force, the ECU 8 according to this embodiment causes the target damping ratio $\zeta^*$ of the filter processing to be less than the damping ratio $\zeta$ of the pitch motion of the vehicle 2. Then, the phase of the post-filter required braking force is more advanced than the phase of the required braking force, and the brake feeling can be improved by, for example, the driver being allowed to promptly sense the brake becoming effective.

In the case of a decrease in the required braking force, the ECU 8 according to this embodiment causes the target damping ratio $\zeta^*$ of the filter processing to exceed the damping ratio $\zeta$ of the pitch motion of the vehicle 2. Then, the phase of the post-filter required braking force is more delayed than the phase of the required braking force. Accordingly, the overshooting of the head acceleration with respect to the vehicle acceleration can be suppressed and the brake feeling can be improved.

In a case where the required braking force is on the increase, the ECU 8 according to this embodiment causes the phase of the post-filter required braking force to be more advanced than the phase of the required braking force and increases the phase difference between the post-filter required braking force and the required braking force in response to the increase in the required braking force. Accordingly, the brake feeling can be improved by, for example, the driver being allowed to promptly sense the brake becoming effective. In a case where the required braking force is on the decrease, the ECU 8 causes the phase of the post-filter required braking force to be more delayed than the phase of the required braking force and increases the phase difference between the post-filter required braking force and the required braking force in response to the decrease in the required braking force. Accordingly, the overshooting of the head acceleration with respect to the vehicle acceleration can be suppressed and the brake feeling can be improved.

First Modification Example of Embodiment

Figure 25:
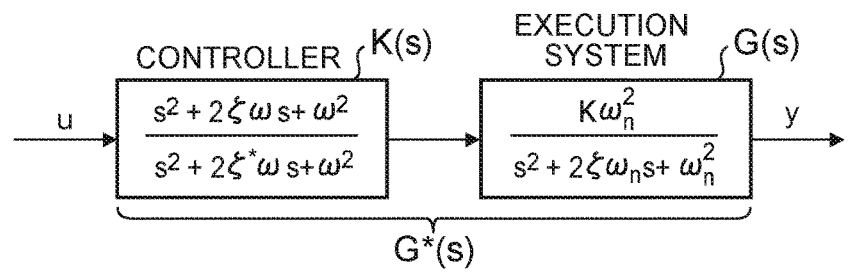
FIG. 25 is a diagram illustrating a transfer function according to a first modification example of the embodiment.

A first modification example of the embodiment will be described. In the above-described embodiment, the natural frequency $\omega_n$ of the pitch motion of the vehicle is equal to the natural frequency $\omega_n$ of the target transfer function G*(s). However, as illustrated in FIG. 25, it is also conceivable that a natural frequency $\omega$ of a model differs in value from the actual natural frequency $\omega_n$ of the vehicle 2. For example, a deviation might arise between the two natural frequencies $\omega$, $\omega_n$ due to a modeling error. In the case of no modeling error, the transfer function G*(s) from an input u to an output y becomes the following Equation (V) and a desired filter property is realized.

$$G^*(s) = \frac{K\omega_n^2}{s^2 + 2\zeta^*\omega_n s + \omega_n^2} \quad (V)$$

Figure 26:
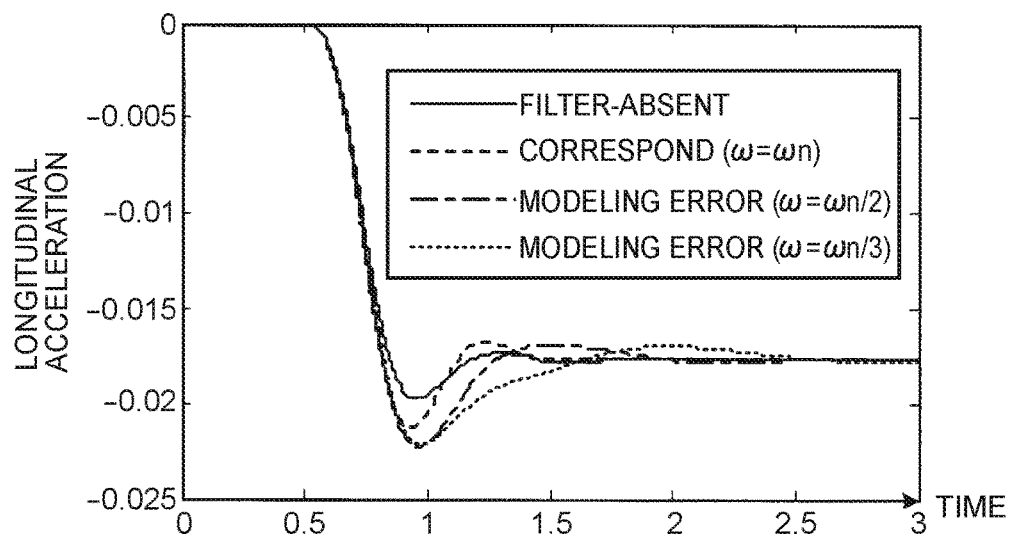
FIG. 26 is a diagram illustrating the post-filter required braking force in the case of a deviation of a natural frequency of a model toward a high frequency side.

In contrast, in the case of the modeling error ($\omega \neq \omega_n$), the transfer function G*(s) becomes the following Equation (VI) and the filter property becomes different from the desired property. The post-filter required braking force in the case of the deviation of the natural frequency $\omega$ of the model toward a high frequency side is illustrated in FIG. 26. FIG. 26 shows a filter-absent required braking force, the post-filter required braking force in a case where the natural frequencies $\omega$, $\omega_n$ are equal to each other (dashed line), the post-filter required braking force in a case where the natural frequency $\omega$ is ½ of the natural frequency $\omega_n$ of the vehicle 2 (one-dot chain line), and the post-filter required braking force in a case where the natural frequency $\omega$ is ⅓ of the natural frequency $\omega_n$ of the vehicle 2 (dotted line). It is conceivable that the natural frequency $\omega$ becoming less than ½ of the natural frequency $\omega_n$ of the vehicle 2 results in an excessive divergence from the desired filter property ($\omega=\omega_n$).

$$G^*(s) = \frac{s^2 + 2\zeta\omega s + \omega^2}{s^2 + 2\zeta^*\omega s + \omega^2} \frac{K\omega_n^2}{s^2 + 2\zeta^*\omega_n s + \omega_n^2} \quad (VI)$$

Figure 27:
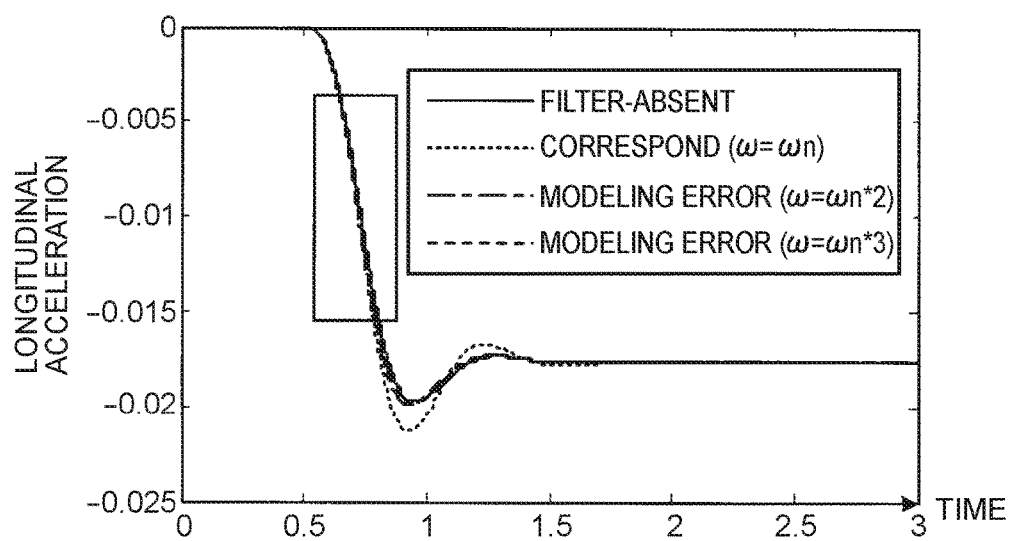
FIG. 27 is a diagram illustrating the post-filter required braking force in the case of a deviation of the natural frequency of the model toward a low frequency side.
Figure 28:
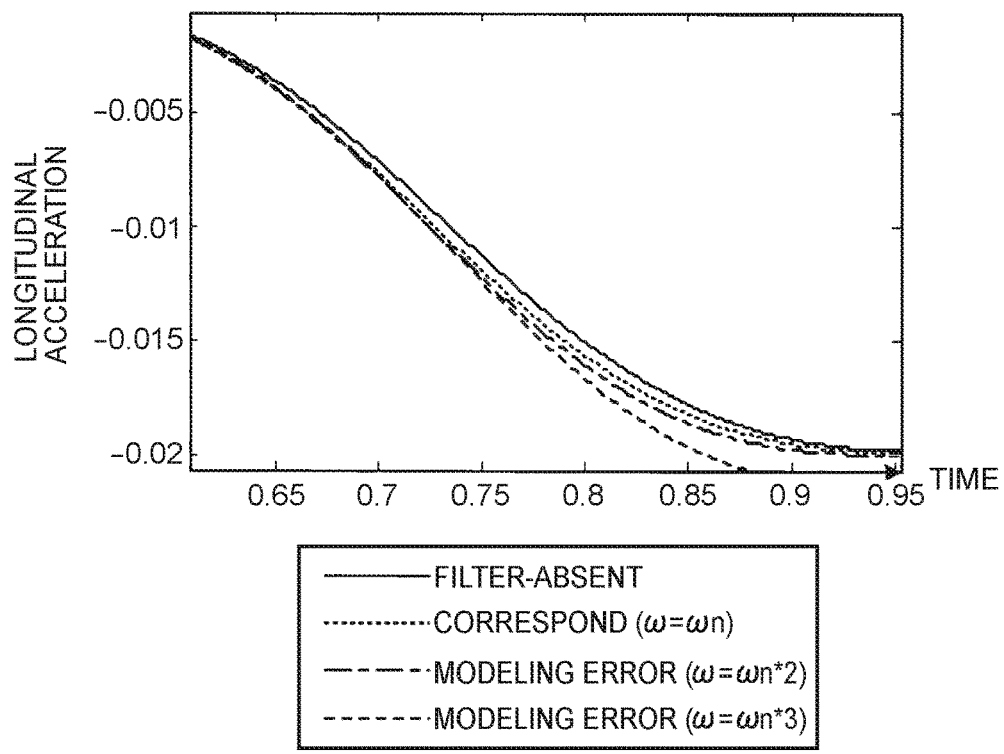
FIG. 28 is an enlarged view of FIG. 27.

The post-filter required braking force in the case of the deviation of the natural frequency $\omega$ of the model toward a low frequency side is illustrated in FIG. 27. FIG. 27 shows the filter-absent required braking force, the post-filter required braking force in a case where the natural frequencies $\omega$, $\omega_n$ are equal to each other (dotted line), the post-filter required braking force in a case where the natural frequency $\omega$ is twice the natural frequency $\omega_n$ of the vehicle 2 (one-dot chain line), and the post-filter required braking force in a case where the natural frequency $\omega$ is three times the natural frequency $\omega_n$ of the vehicle 2 (dashed line). FIG. 28 is an enlarged view of the frame in FIG. 27. It is conceivable that the natural frequency $\omega$ becoming more than twice the natural frequency $\omega_n$ of the vehicle 2 results in an excessive divergence from the desired filter property ($\omega=\omega_n$). From the above description, it is conceivable that the natural frequency $\omega$ of the model preferably satisfies $\omega_n/2 \leq \omega \leq 2\omega_n$ for the desired filter property to be attained. In other words, an effect similar to that of the braking force control device 1 of the embodiment described above can be attained insofar as the peak frequency $\omega$ of the gain characteristic in the lead filter and the delay filter of the response compensation filter F1 ranges from 0.5 times the natural frequency $\omega_n$ to twice the natural frequency $\omega_n$ (close to the natural frequency $\omega_n$).

Second Modification Example of Embodiment

Figure 29:
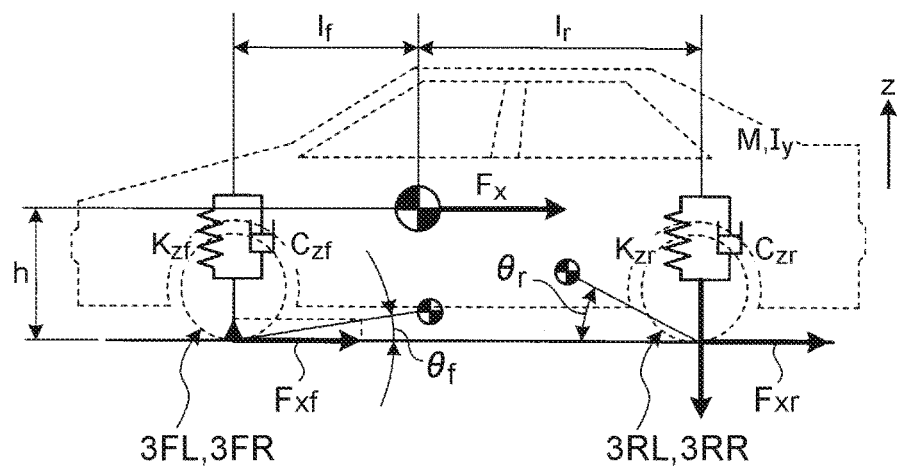
FIG. 29 is a diagram illustrating a sprung mass model according to a second modification example of the embodiment.

A second modification example of the embodiment will be described. The response compensation filter F1 according to the embodiment described above is a secondary/secondary filter, but the order of the filter is not limited thereto. In the second modification example, the application of a filter with a higher order will be described. FIG. 29 is a diagram illustrating a sprung mass model relating to the second modification example of the embodiment. The sprung mass model illustrated in FIG. 29 is a model of two degrees of freedom, including the pitch motion and a heave motion (motion in a bounce direction). The equations of motion of this model of two degrees of freedom are the following Equation (VII) and Equation (VIII), in which z represents a vertical displacement of the center-of-gravity position of the vehicle 2, $F_{xf}$ represents the braking force generated in the front wheels 3FL, 3FR, $F_{xr}$ represents the braking force generated in the rear wheels 3RL, 3RR, $\theta_f$ represents a pitch angle depending on the bounce of the front wheels 3FL, 3FR, $\theta_r$ represents a pitch angle depending on the bounce of the rear wheels 3RL, 3RR, and M represents the mass of the vehicle 2.

$$I_y\ddot{\theta}=l_fK_{zf}(z-l_f\theta)+l_fC_{zf}(\dot{z}-l_f\dot{\theta})-l_rK_{zr}(z+l_r\theta)-l_rC_{zr}(\dot{z}+l_r\dot{\theta})-(F_{xf}+F_{xr})h+l_fF_{xf}\tan\theta_f+l_rF_{xr}\tan\theta_r \quad (VII)$$

$$M\ddot{z}=K_{zf}(z-l_f\theta)-C_{zf}(\dot{z}-l_f\dot{\theta})-K_{zr}(z+l_r\theta)-C_{zr}(\dot{z}+l_r\dot{\theta})-F_{xf}\tan\theta_f+F_{xr}\tan\theta_r \quad (VIII)$$

Figure 30:
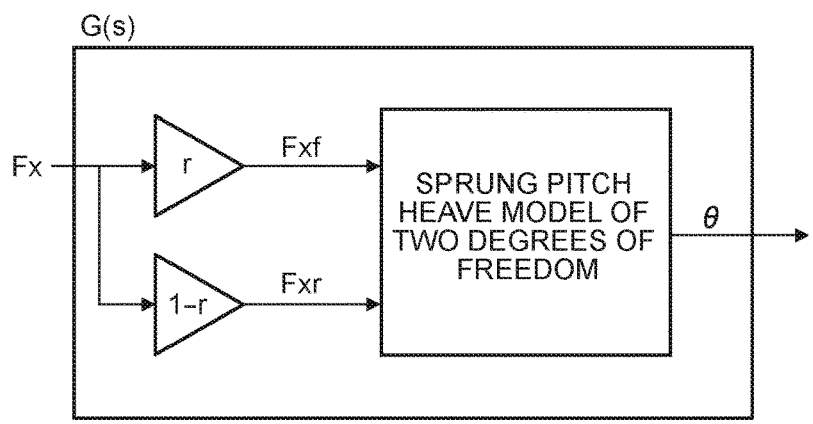
FIG. 30 is a block diagram of a transfer function of a vehicle according to the second modification example of the embodiment.

FIG. 30 is a block diagram of the transfer function G(s) of the vehicle 2 relating to the second modification example of the embodiment. Assuming that the total required braking force of the vehicle 2 is $F_x$ and the fixed braking force distribution of the front and rear wheels is r, the braking force $F_{xf}$ of the front wheels is $rF_x$ and the braking force $F_{xr}$ of the rear wheels is $(1-r)F_x$. The transfer function G(s) of the vehicle 2 is the following Equation (IX).

$$G(s) = \frac{b_2 s^2 + b_3 s + b_4}{a_0 s^4 + a_1 s^3 + a_2 s^2 + a_3 s + a_4} \quad (IX)$$

$$\begin{cases} a_0 = I_y M \\ a_1 = (l_f^2 C_f + l_r^2 C_r)M + (C_f + C_r)I_y \\ a_2 = (l_f^2 K_f + l_r^2 K_r)M + (K_f + K_r)I_y + L^2 C_f C_r \\ a_3 = (C_f K_f + C_r K_r)L^2 \\ a_4 = K_f K_r L^2 \end{cases}$$

$$\begin{cases} b_2 = (-h + rL_f\tan\theta_f + (1-r)L_r\tan\theta_r)M \\ b_3 = ((1-r)L\tan\theta_r -)C_f + (rL\tan\theta_f - h)C_r \\ b_4 = ((1-r)L\tan\theta_r - h)K_f + (rL\tan\theta_f - h)K_r \end{cases}$$

Assuming that the target transfer function G*(s) is the following Equation (X), the function K(s) of the response compensation filter F1 is the following Equation (XI).

$$G^*(s) = G(0)\frac{\omega_n^2}{s^2 + 2\zeta^*\omega_n s + \omega_n^2}, \quad (X)$$

$$G_{(0)} = \frac{b_4}{a_4}$$

$$K(s) = \frac{b_4}{a_4} \frac{\omega_n^2(a_0 s^4 + a_1 s^3 + a_2 s^2 + a_3 s + a_4)}{(s^2 + 2\zeta^*\omega_n s + \omega_n^2)(b_2 s^2 + b_3 s + b_4)} \quad (XI)$$

Figure 31:
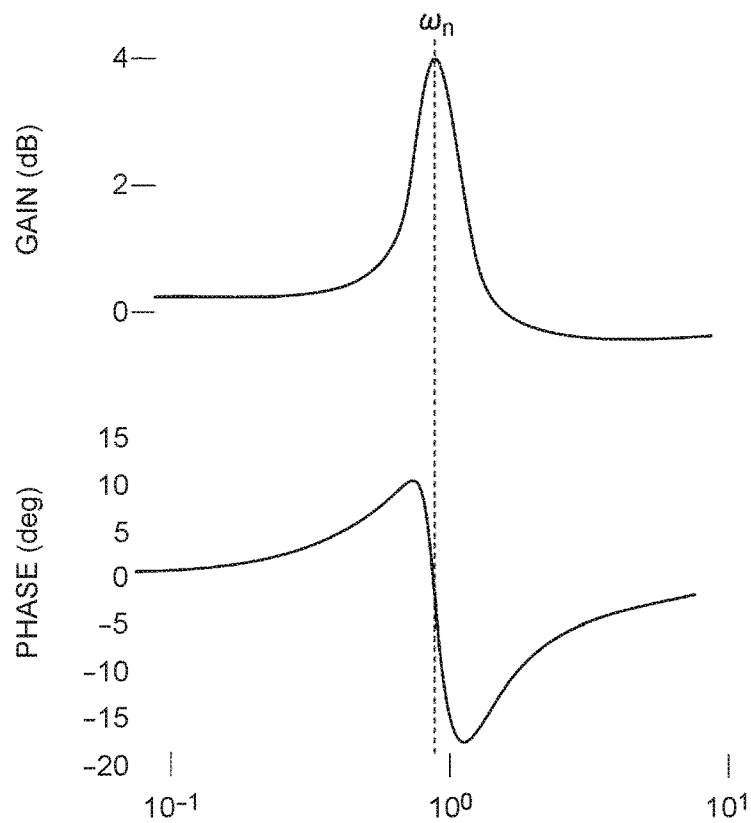
FIG. 31 is a bode diagram of a response compensation filter according to the second modification example of the embodiment.
Figure 32:
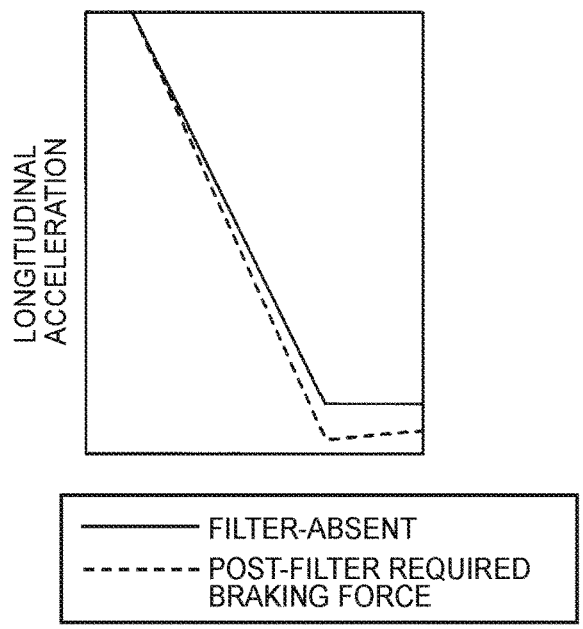
FIG. 32 is a diagram illustrating a post-filter required braking force by the response compensation filter according to the second modification example of the embodiment.
Figure 33:
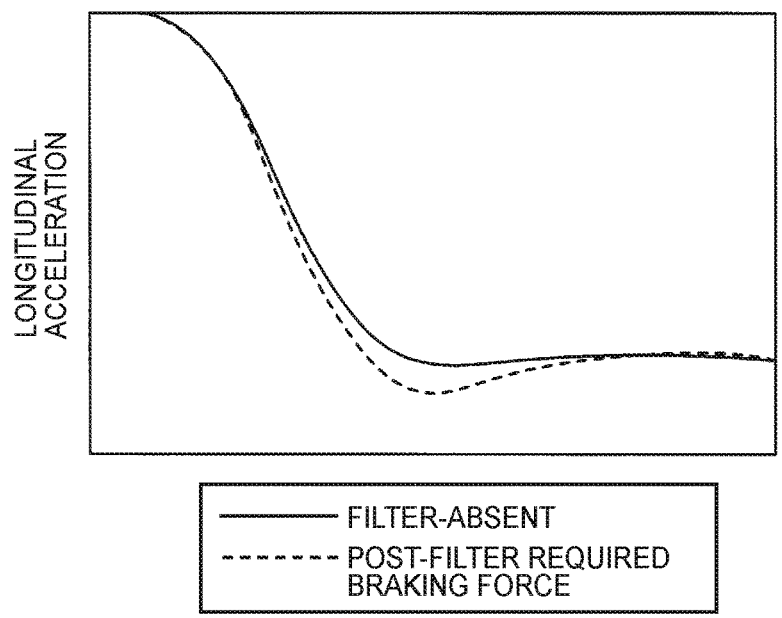
FIG. 33 is a diagram illustrating a transition of a pitch angle according to the second modification example of the embodiment.

The response compensation filter F1 is a quaternary/quaternary filter when the sprung mass model taking the pitch motion and the heave motion into account is used as described above. FIG. 31 is a bode diagram of the response compensation filter F1 according to the second modification example, FIG. 32 is a diagram illustrating the post-filter required braking force by the response compensation filter F1 according to the second modification example, and FIG. 33 is a diagram illustrating a transition of the pitch angle θ generated by the post-filter required braking force by the response compensation filter F1 according to the second modification example. As is apparent from FIGS. 31 to 33, the property of the quaternary/quaternary filter is close to the property of the secondary/secondary filter according to the embodiment described above. For example, as illustrated in FIG. 31, the gain becomes a maximum value at the natural frequency $\omega_n$ of the pitch motion in the frequency-gain characteristic. In addition, the frequency-phase characteristic has an extremely high value at a frequency lower than the natural frequency $\omega_n$.

Third Modification Example of Embodiment

The mathematical formulas of the response compensation filter F1 according to the embodiment and the second modification example is an example, and the invention is not limited thereto. An effect similar to that of the response compensation filter F1 can be achieved with a filter equivalent to the response compensation filter F1 according to the embodiment and the second modification example or a filter substantially equivalent to the response compensation filter F1 according to the embodiment and the second modification example.

Fourth Modification Example of Embodiment

In the above-described embodiment and each of the modification examples, the required braking force is based on the driver's brake pedal depression operation, but the invention is not limited thereto. For example, the filter processing by the response compensation filter F1 may be performed on the required braking force by automatic braking control of the vehicle 2. In addition, the above-described embodiment and each of the modification examples can be applied to a vehicle performing braking control by a so-called by-wire mode. For example, the above-described embodiment and each of the modification examples can be applied to a vehicle in which a control unit is interposed at all times between the driver's braking operation and the braking device 7. The detection of the required braking force is not limited to detection based on the master cylinder pressure. For example, the required braking force may be calculated based on the pedal stroke and pedal effort of the brake pedal 6.

The content disclosed in the above-described embodiment and modification examples can be executed through an appropriate combination.

What is claimed is:
1. A braking force control device comprising:
an actuator configured to control a braking force generated in a vehicle wheel of a vehicle; and
a control unit configured to generate a braking force command value by performing a filter processing on a required braking force based on a braking operation amount, cause a phase of the braking force command value to be more advanced than a phase of the required braking force and increase a phase difference between the braking force command value and the required braking force in response to an increase in the required braking force in a case where the required braking force increases, cause the phase of the braking force command value to be more delayed than the phase of the required braking force and increase the phase difference between the braking force command value and the required braking force in response to a decrease in the required braking force in a case where the required braking force decreases, and output the braking force command value to the actuator.
2. The braking force control device according to claim 1, wherein a frequency at which a magnitude of a gain reaches a peak in a frequency gain characteristic of the filter processing is a natural frequency of a pitch motion of the vehicle or a frequency that ranges from 0.5 times the natural frequency to twice the natural frequency of the pitch motion of the vehicle.
3. The braking force control device according to claim 1, wherein the control unit is configured to change a phase characteristic with respect to a frequency in the filter processing so as to become a frequency at which an advance amount of the phase reaches its maximum and which is lower than a natural frequency of a pitch motion of the vehicle when the required braking force increases.
4. The braking force control device according to claim 1, wherein the control unit is configured to change a phase characteristic with respect to a frequency in the filter processing so as to become a frequency at which a delay amount of the phase reaches its maximum and which is lower than a natural frequency of a pitch motion of the vehicle when the required braking force decreases.

* * * * *